（12） United States Patent
Abe et al.

(10) Patent No.: US 12,398,338 B2
(45) Date of Patent: *Aug. 26, 2025

(54) VISCOSITY MODIFIER FOR LUBRICATING OIL AND LUBRICATING OIL COMPOSITION FOR HYDRAULIC FLUID

(71) Applicant: MITSUI CHEMICALS, INC., Tokyo (JP)

(72) Inventors: Shota Abe, Chiba (JP); Hirotaka Kanaya, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/578,257

(22) PCT Filed: Jul. 15, 2022

(86) PCT No.: PCT/JP2022/027870
§ 371 (c)(1),
(2) Date: Jan. 10, 2024

(87) PCT Pub. No.: WO2023/002947
PCT Pub. Date: Jan. 26, 2023

(65) Prior Publication Data
US 2024/0318095 A1    Sep. 26, 2024

(30) Foreign Application Priority Data

Jul. 20, 2021    (JP) ................. 2021-119581

(51) Int. Cl.
| | | |
|---|---|---|
| *C10M 143/04* | (2006.01) | |
| *C08F 210/16* | (2006.01) | |
| *C10M 169/04* | (2006.01) | |
| *C10N 20/02* | (2006.01) | |
| *C10N 20/04* | (2006.01) | |
| *C10N 30/02* | (2006.01) | |
| *C10N 40/08* | (2006.01) | |

(52) U.S. Cl.
CPC ......... *C10M 143/04* (2013.01); *C08F 210/16* (2013.01); *C10M 169/041* (2013.01); *C08F 2420/07* (2021.01); *C10M 2203/003* (2013.01); *C10M 2205/024* (2013.01); *C10N 2020/02* (2013.01); *C10N 2020/04* (2013.01); *C10N 2030/02* (2013.01); *C10N 2040/08* (2013.01)

(58) Field of Classification Search
CPC ...... C08L 23/14; C08L 91/00; C08F 2420/07; C08F 210/06; C08F 210/16; C08F 4/65927; C08F 4/65912; C08F 4/65908; C08F 2500/02; C08F 2500/03; C08F 2500/27; C08F 2500/17; C08F 2500/26; C10N 2030/06; C10N 2020/02; C10N 2030/08; C10N 2030/02; C10N 2070/00; C10N 2020/04; C10N 2020/011; C10N 2040/08; C10M 143/02; C10M 169/04; C10M 143/04; C10M 169/041; C10M 143/08; C10M 2205/022; C10M 2205/0285; C10M 2205/026; C10M 2205/024; C10M 2209/084; C10M 2203/003; C10M 2203/1006

See application file for complete search history.

(56) References Cited

U.S. PATENT DOCUMENTS

| | | |
|---|---|---|
| 3,909,432 A | 9/1975 | McGuire et al. |
| 4,922,046 A | 5/1990 | Kinoshita et al. |
| 6,459,005 B1 | 10/2002 | Hirano et al. |
| 6,525,007 B2 | 2/2003 | Okada et al. |
| 9,080,125 B2 | 7/2015 | Deshimaru |
| 9,534,188 B2 | 1/2017 | Kaneshige et al. |
| 10,040,884 B2 | 8/2018 | Harada et al. |
| 10,329,366 B2 | 6/2019 | Harada et al. |

(Continued)

FOREIGN PATENT DOCUMENTS

| | | |
|---|---|---|
| EP | 2 243 795 A1 | 10/2010 |
| EP | 2 921 509 A1 | 9/2015 |

(Continued)

OTHER PUBLICATIONS

Lubricants Department, Lubricant Technology 2nd section of Idemitsu Kosan Co Ltd, "Illustrated guide to the introductory basics of industrial lubricating oil", The Daily Industrial News, Nikkan Kogyo Shimbun, Ltd., 2011, pp. 108-109 (with partial machine translation).

(Continued)

*Primary Examiner* — Vishal V Vasisth
(74) *Attorney, Agent, or Firm* — Foley & Lardner LLP

(57) ABSTRACT

A viscosity modifier for lubricating oil, including an (C) ethylene-α-olefin copolymer having an ethylene molar content rate within a range of 30 to 70 mol %, a rotational viscosity at 150° C. of 300 to 8,000 mPa·s, a Hasen chromaticity of 30 or lower, a molecular weight distribution (Mw/Mn) of 2.5 or less, and a B value of 1.1 or more; a lubricating oil composition with a lubricating oil base oil including a (A) mineral oil having a kinematic viscosity at 40° C. of 10 to 100 mm²/s, a viscosity index of 90 or more, and a pour point of 0° C. or lower and/or a (B) synthetic oil having a kinematic viscosity at 40° C. of 4 to 100 mm²/s, a viscosity index of 90 or more and a pour point of −30° C. or lower; and the viscosity modifier having has a kinematic viscosity at 40° C. of 28 to 170 mm²/s.

8 Claims, No Drawings

(56) References Cited

U.S. PATENT DOCUMENTS

| | | |
|---|---|---|
| 11,155,768 B2 | 10/2021 | Abe et al. |
| 2002/0055445 A1 | 5/2002 | Okada et al. |
| 2007/0270320 A1 | 11/2007 | Itou et al. |
| 2009/0088543 A1 | 4/2009 | Yang et al. |
| 2010/0008810 A1 | 1/2010 | Kamimura |
| 2012/0277134 A1 | 11/2012 | Deshimaru |
| 2012/0283162 A1 | 11/2012 | Tsubouchi |
| 2013/0085089 A1 | 4/2013 | Takeuchi et al. |
| 2014/0005086 A1 | 1/2014 | Huang et al. |
| 2015/0080280 A1 | 3/2015 | Kaneshige et al. |
| 2015/0266985 A1 | 9/2015 | Uhm et al. |
| 2017/0114166 A1 | 4/2017 | Harada et al. |
| 2017/0298287 A1 | 10/2017 | Tamura |
| 2018/0273662 A1 | 9/2018 | Harada et al. |
| 2019/0338212 A1 | 11/2019 | Abe et al. |
| 2020/0248095 A1 | 8/2020 | Guerin |

FOREIGN PATENT DOCUMENTS

| | | |
|---|---|---|
| EP | 3 124 505 A1 | 2/2017 |
| JP | S63-022897 A | 1/1988 |
| JP | H05-070788 A | 3/1993 |
| JP | H08-053683 A | 2/1996 |
| JP | H08-301939 A | 11/1996 |
| JP | 2002-519448 A | 7/2002 |
| JP | 3816847 B2 | 8/2006 |
| JP | 2006-325369 A | 11/2006 |
| JP | 2007-284564 A | 11/2007 |
| JP | 2008-179679 A | 8/2008 |
| JP | 2009-256665 A | 11/2009 |
| JP | 4414123 B2 | 2/2010 |
| JP | 2011-190377 A | 9/2011 |
| JP | 2012-031359 A | 2/2012 |
| JP | 2012-244810 A | 12/2012 |
| JP | 2013-506036 A | 2/2013 |
| JP | 2013-126280 A | 6/2013 |
| JP | 2013-544948 A | 12/2013 |
| JP | 2014-157200 A | 8/2014 |
| JP | 5771532 B2 | 9/2015 |
| JP | 5779376 B2 | 9/2015 |
| JP | 2016-069404 A | 5/2016 |
| JP | 2016-069406 A | 5/2016 |
| JP | 2016-069407 A | 5/2016 |
| JP | 2016-069408 A | 5/2016 |
| JP | 2016-098341 A | 5/2016 |
| JP | 2016-098342 A | 5/2016 |
| JP | 2016069405 A * | 5/2016 |
| JP | 2016-108406 A | 6/2016 |
| JP | 2016-188318 A | 11/2016 |
| JP | 2019-521227 A | 7/2019 |
| JP | 2019-154115 A | 9/2019 |
| JP | 2021-500463 A | 1/2021 |
| JP | 2021-164298 A | 10/2021 |
| WO | WO-00/00521 A1 | 1/2000 |
| WO | WO-00/34420 A1 | 6/2000 |
| WO | WO-2006/102153 A1 | 9/2006 |
| WO | WO-2009/101936 A1 | 8/2009 |
| WO | WO-2011/038331 A1 | 3/2011 |
| WO | WO-2013/154005 A1 | 10/2013 |
| WO | WO-2015/147215 A1 | 10/2015 |
| WO | WO-2018/013286 A1 | 1/2018 |
| WO | WO-2018/131543 A1 | 7/2018 |

OTHER PUBLICATIONS

Lubricants Department, Lubricant Technology 2nd section of Idemitsu Kosan Co Ltd, "Illustrated guide to the introductory basics of industrial lubricating oil", The Daily Industrial News, Nikkan Kogyo Shimbun, Ltd., 2011, pp. 126-131 (with partial machine translation).

Lubricants Department, Lubricant Technology 2nd section of Idemitsu Kosan Co Ltd, "Illustrated guide to the introductory basics of industrial lubricating oil", The Daily Industrial News, Nikkan Kogyo Shimbun, Ltd., 2011, pp. 186-189 (with partial machine translation).

BASF, "Catalog Lubricant Solutions", retrieved from: https://www.basf.com/jp/documents/ja/products-and-industories/chemicals/catalog-lubricant-solutions_202112.pdf.assetdownload.pdf on Feb. 28, 2024, 5 pages.

* cited by examiner

VISCOSITY MODIFIER FOR LUBRICATING OIL AND LUBRICATING OIL COMPOSITION FOR HYDRAULIC FLUID

CROSS-REFERENCE TO RELATED APPLICATIONS

The present application claims priority under 35 U.S.C. § 371 to International Patent Application No. PCT/JP2022/027870, filed Jul. 15, 2022, which claims priority to and the benefit of Japanese Patent Application No. 2021-119581, filed Jul. 20, 2021. The contents of these applications are hereby incorporated by reference in their entireties.

TECHNICAL FIELD

The present invention relates to a viscosity modifier for lubricating oil and a lubricating oil composition for hydraulic fluid containing the same.

BACKGROUND ART

Among industrial equipment machines, hydraulic systems that can convert pressurization energy of hydraulic pumps into kinetic energy (work energy) are frequently used in machine tools/forming machines that require large work energy, such as injection forming machines, machine tools, press processing machines, and forging press processing. Similarly, hydraulic systems are widely used also in construction machinery such as excavators, wheel loaders, skid steer loaders, and tractors.

Meanwhile, global warming is progressing on a global scale, and there is an urgent need to reduce emissions of carbon dioxide that is one of the greenhouse gases. Along therewith, hydraulic systems used in various industrial fields, such as those described above, have also been required to reduce power consumption. In order to reduce power consumption in hydraulic systems, it is effective to reduce fluid resistance in hydraulic pumps and piping by lowering a viscosity of lubricating oil. Lowering viscosities from low temperature to ordinary temperature can significantly reduce energy loss upon startup. However, there are concerns that lowering the viscosity of lubricating oil results in internal leakage upon operation at a high temperature, or deteriorates lubricity due to loss of an oil film, thereby causing friction loss. There has been a demand for lubricating oil excellent in temperature/viscosity characteristics, i.e., lubricating oil that hardly causes fluid loss at a low temperature and has a smaller drop in viscosity at a high temperature (Non-Patent Literature 1).

In order to meet these requirements, hydraulic fluid using, as a base oil and as a viscosity modifier, an ethylene-α-olefin, which has excellent temperature/viscosity characteristics, has been investigated (Patent Literatures 1 and 2). However, all of the disclosed compositions have high a viscosity and are insufficient for the purpose of energy saving. Single use of synthetic oil (poly-α-olefin) that has a sufficiently low viscosity and excellent temperature/viscosity characteristics, has been investigated, however, it still has room for further investigation (Patent Literature 3).

Polymethacrylates and olefin copolymers have also been investigated as viscosity modifiers; however, there is room for improvement in their handleability such as difficulty in weighing them upon preparing hydraulic fluid because they are in liquid form and difficulty in dissolving them in lubricating oil base oil because they are solid (Patent Literatures 4 and 5).

CITATION LIST

Patent Literature

Patent Literature 1: JPS63-22897A
Patent Literature 2: JPH05-70788A
Patent Literature 3: JP2002-519448A
Patent Literature 4: JP2014-157200A
Patent Literature 5: JP2019-521227A

Non-Patent Literature

Non-Patent Literature 1: Lubrication Technology Section 2, Lubricating Oil Department, Idemitsu Kosan Co., Ltd., "Basics of industrial lubricating oil (2011)," published by Nikkan Kogyo Shimbun, Ltd.

SUMMARY OF INVENTION

Technical Problem

In view of these problems in such conventional technologies, an object to be solved by the present invention is to provide a viscosity modifier having extremely excellent temperature/viscosity characteristics, i.e., both oil film retention at a high temperature and low temperature viscosity characteristics, compared to conventional lubricating oil containing the same lubricating oil base oil, and being capable of maintaining lubricating oil performance over a long period of use, i.e., high handleability excellent in shear stability, and further an object of the present invention is to provide a lubricating oil composition for hydraulic fluid enabling energy saving, by using the viscosity modifier.

Solution to Problem

As a result of diligent investigations in order to develop a viscosity modifier with excellent performance, the present inventors of the present invention have found a specific ethylene-α-olefin (co) polymer. Furthermore, the present inventors have found that a lubricating oil composition satisfying specific conditions can solve the aforementioned problems and thus have completed the present invention. Specifically, the following aspects are included:

[1] A viscosity modifier for lubricating oil, comprising an (C) ethylene-α-olefin copolymer having the following characteristics (C1) to (C5):

(C1) an ethylene molar content rate is within a range of 30 to 70 mol %,
(C2) a rotational viscosity at 150° C. is 300 to 8,000 mPa·s,
(C3) a Hasen chromaticity is 30 or lower,
(C4) a molecular weight distribution (Mw/Mn) is 2.5 or less in molecular weight obtained in terms of polystyrene, as measured by gel permeation chromatography (GPC), and
(C5) a B value represented by the following formula [1] is 1.1 or more:

[Math. 1]

$$B = \frac{P_{OE}}{2P_O \cdot P_E} \quad [1]$$

(wherein in the formula, $P_E$ represents a molar fraction of ethylene component, $P_O$ represents a molar fraction of α-olefin component, and $P_{OE}$ represents a molar fraction of ethylene-α-olefin chain in a total dyad chain.)

[2] The viscosity modifier for lubricating oil according to [1], wherein the (C) ethylene-α-olefin copolymer satisfies the requirement that a weight-average molecular weight (Mw) is 10,000 to 50,000 obtained in terms of polystyrene, as measured by gel permeation chromatography (GPC).

[3] The viscosity modifier for lubricating oil according to [1], wherein the (C) ethylene-α-olefin copolymer satisfies the requirement that a weight-average molecular weight (Mw) is higher than 12,000 and 40,000 or lower obtained in terms of polystyrene, as measured by gel permeation chromatography (GPC).

[4] A lubricating oil composition for hydraulic fluid, comprising: a lubricating oil base oil comprising a (A) mineral oil having the following characteristics (A1) to (A3) and/or a (B) synthetic oil having the following characteristics (B1) to (B3); and the viscosity modifier for lubricating oil according to [1], wherein the lubricating oil composition for hydraulic fluid has a kinematic viscosity at 40° C. of 28 to 170 mm²/s:

(A1) a kinematic viscosity at 40° C. is 10 to 100 mm²/s, (A2) a viscosity index is 90 or more, (A3) a pour point is 0° C. or lower, (B1) a kinematic viscosity at 40° C. is 4 to 100 mm²/s, (B2) a viscosity index is 90 or more, (B3) a pour point is −30° C. or lower.

[5] The lubricating oil composition for hydraulic fluid according to [4], wherein an ethylene molar content rate of the (C) ethylene-α-olefin copolymer is within a range of 40 to 60 mol %.

[6] The lubricating oil composition for hydraulic fluid according to [4] or [5], wherein a rotational viscosity of the (C) ethylene-α-olefin copolymer at 150° C. is 1,000 to 5,000 mPa·s.

[7] The lubricating oil composition for hydraulic fluid according to any one of [4] to [6], wherein an α-olefin of the (C) ethylene-α-olefin copolymer is propylene.

[8] The lubricating oil composition for hydraulic fluid according to any one of [4] to [7], wherein the content of the (C) ethylene-α-olefin copolymer is 1 to 10% by mass.

[9] A hydraulic oil for machine tools, forming machines, or construction machinery, comprising the lubricating oil composition for hydraulic fluid according to any one of [4] to [8].

A method for producing the viscosity modifier for lubricating oil according to [1], comprising a step of producing the (C) ethylene-α-olefin copolymer by the following method (α):

method (α): a method comprising a step of solution polymerizing ethylene and a C3-C20 α-olefin in the presence of a catalyst system comprising a bridged metallocene compound (a-1') represented by formula [II-I], and at least one compound (b) selected from the group consisting of an organometallic compound (b-1), an organoaluminum oxy compound (b-2), and a compound (b-3) that reacts with the bridged metallocene compound (a-1') to form an ion pair:

[Chem. 1]

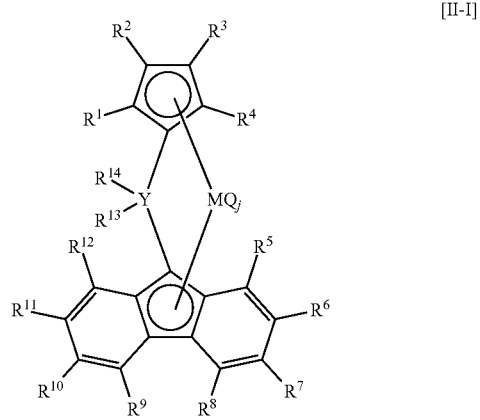

[II-I]

[wherein in formula [II-I], $R^1$, $R^2$, $R^3$, $R^4$, $R^5$, $R^8$, $R^9$ and $R^{12}$ are each independently a hydrogen atom, a C1-C20 hydrocarbon group or a silicon-containing hydrocarbon group, and a plurality of adjacent groups are optionally connected together to form a ring structure, $R^6$ and $R^{11}$ are identical to each other and are each a hydrogen atom, a C1-C20 hydrocarbon group or a silicon-containing hydrocarbon group, $R^7$ and $R^{10}$ are identical to each other and are each a hydrogen atom, a C1-C20 hydrocarbon group or a silicon-containing hydrocarbon group, $R^6$, $R^7$, $R^{10}$ and $R^{11}$ are not simultaneously hydrogen atoms;

$R^6$ and $R^7$ are optionally bonded with a C2-C3 hydrocarbon to form a ring structure, $R^{10}$ and $R^{11}$ are optionally bonded with a C2-C3 hydrocarbon to form a ring structure, $R^{13}$ and $R^{14}$ are each independently an aryl group;

Y is a carbon atom or a silicon atom;

M is a titanium atom, a zirconium atom, or a hafnium atom;

Q is independently a halogen atom, a C1-C20 hydrocarbon group, an anionic ligand or a neutral ligand capable of coordinating with a lone electron pair; and j is an integer of 1 to 4.]

Advantageous Effects of Invention

The viscosity modifier for lubricating oil of the present invention has extremely excellent temperature/viscosity characteristics, i.e., both oil film retention at a high temperature and low temperature viscosity characteristics, compared to conventional lubricating oil containing the same lubricating oil base oil, and is capable of maintaining lubricating oil performance over a long period of use, and further has extremely excellent weighing accuracy upon production of the lubricating oil as well as excellent solubility in lubricating oil base oil. The lubricating oil composition obtained by using this viscosity modifier is suitable for a hydraulic fluid, in particular, a hydraulic oil for machine tools, forming machines, and construction machinery.

DESCRIPTION OF EMBODIMENTS

The viscosity modifier for lubricating oil and the lubricating oil composition for hydraulic fluid, according to the present invention (hereafter, the lubricating oil composition for hydraulic fluid is also referred to simply as "lubricating oil composition"), will be described in detail below.

[Viscosity Modifier for Lubricating Oil]

The viscosity modifier for lubricating oil according to the present invention comprises the following (C) ethylene-α-olefin copolymer.

<(C) ethylene-α-olefin copolymer>

The (C) ethylene-α-olefin copolymer has the following characteristics (C1) to (C5):

(C1) An Ethylene Molar Content Rate is within a Range of 30 to 70 Mol %.

An ethylene molar content rate of (C) ethylene-α-olefin copolymer is usually 30 to 70 mol %, preferably 40 to 60 mol %, and particularly preferably 45 to 58 mol %. Outside this range of the ethylene molar content rate, crystals easily form from the ethylene-α-olefin copolymer at low temperature, a low temperature viscosity increases, and the low temperature viscosity characteristics of the lubricating oil composition deteriorate.

The ethylene molar content rate of (C) ethylene-α-olefin copolymer is measured by 13C-NMR according to the method described in "Polymer Analysis Handbook" (Asakura Publishing Co., Ltd., P163-170). A sample obtained by this method can also be measured by Fourier transform infrared spectroscopy (FT-IR) as a known sample.

(C2) A Rotational Viscosity at 150° C. is 300 to 8,000 mPa·s.

The value of this rotational viscosity is a value measured by the method described in JIS Z8803. The rotational viscosity of (C) ethylene-α-olefin copolymer at 150° C. is 300 to 8,000 mPa·s, preferably 800 to 6,000 mPa·s, more preferably 1,000 to 5,000 mPa·s, further preferably 1,200 to 4,500 mPa·s, and particularly preferably 1,500 to 4,000 mPa·s. When the rotational viscosity of (C) ethylene-α-olefin copolymer at 150° C. exceeds the above range, shear stability and heat resistance of the lubricating oil composition worsen, and it becomes difficult therefore to homogeneously melt into the lubricating oil base oil. Below the above range of the rotational viscosity of (C) ethylene-α-olefin copolymer, pourability thereof increases upon production of the lubricating oil composition, resulting in difficulty in stable weighing and significantly reducing weighing accuracy, which is not preferred.

(C3) A Hasen Chromaticity is 30 or Lower.

The value of this Hasen chromaticity is that measured by the method described in JIS K0071. The Hasen chromaticity of (C) ethylene-α-olefin copolymer is 30 or less, preferably 25 or less, and more preferably 20 or less. The Hasen chromaticity of (C) ethylene-α-olefin copolymer exceeding this range means that an oxygen-containing functional group is excess in amount in a molecule of the (C) ethylene-α-olefin copolymer, whereby heat resistance of the resulting lubricating oil composition deteriorates.

(C4) A Molecular Weight Distribution is 2.5 or Less.

The molecular weight distribution of (C) ethylene-α-olefin copolymer is measured by gel permeation chromatography (GPC) according to the method described below and calculated as a ratio (Mw/Mn) of a weight-average molecular weight (Mw) to a number-average molecular weight (Mn) obtained in terms of standard polystyrene. The Mw/Mn is 2.5 or less, preferably 2.3 or less, and more preferably 2.2 or less. The molecular weight distribution exceeding this range means that low molecular weight components and high molecular weight components are included more, and containing low molecular weight components more increases a component that is easy to volatilize, increases the amount of evaporation loss in the lubricating oil composition, and lowers a thickening effect, and containing high molecular weight components more causes deterioration of shear stability and heat stability of the lubricating oil composition.

(C5) B Value is 1.1 or More.

B value represented by the following formula [1] of (C) ethylene-α-olefin copolymer is 1.1 or more and preferably 1.2 or more.

[Math. 2]

$$B = \frac{P_{OE}}{2P_O \cdot P_E} \quad [1]$$

wherein in formula [1], $P_E$ represents a molar fraction of ethylene component, $P_O$ represents a molar fraction of α-olefin component, and $P_{OE}$ represents a molar fraction of ethylene-α-olefin chain in a total dyad chain.

The B value is an index of randomness of a copolymer monomer chain distribution in a copolymer, and $P_E$, $P_O$, and $P_{OE}$ in formula [1] above can be obtained by measuring 13C-NMR spectra, based on the known literature such as reports of J. C. Randall [Macromolecules, 15, 353 (1982)] and J. Ray et al. [Macromolecules, 10, 773 (1977)], and "Polymer Analysis Handbook" (published by Asakura Publishing Co, P163-170). The larger the above B value, the less the chain structure of ethylene and an α-olefin, the more uniform the distribution of ethylene and the α-olefin, and the narrower the composition distribution. As a result, the larger the B value, the lower the pour point of (C) ethylene-α-olefin copolymer and the more favorable the low temperature viscosity characteristics of the lubricating oil composition. The specific measurement conditions of the B value are as described in Examples.

The (C) ethylene-α-olefin copolymer further preferably has at least one characteristic of (C6) and (C7).

(C6) A Weight-Average Molecular Weight is 10,000 to 50,000.

The weight-average molecular weight (Mw) of (C) ethylene-α-olefin copolymer is measured by gel permeation chromatography (GPC) according to the method described below and obtained in terms of standard polystyrene. This weight-average molecular weight (Mw) is preferably 12,000 to 40,000, more preferably higher than 12,000 to 40,000 or lower, further preferably 15,000 to 35,000, and even further preferably 20,000 to 30,000. The (C) ethylene-α-olefin copolymer with a weight-average molecular weight (Mw) of 10,000 or higher has a few components that are easy to volatilize, whereby the lubricating oil composition has less evaporation loss and is excellent in viscosity thickening effect and temperature/viscosity characteristics, and the (C) ethylene-α-olefin copolymer having a Mw of 50,000 or lower allows the lubricating oil composition to have a low pour point, excellent shear stability and heat resistance, and facilitates the (C) ethylene-α-olefin copolymer to uniformly melt into the lubricating oil base oil.

(C7) No Melting Point Observed.

The (C) ethylene-α-olefin copolymer preferably has no melting point observed in differential scanning calorimetry (DSC). The phrase no melting point (Tm) is observed means that the heat of fusion (ΔH) (unit: J/g) measured by differential scanning calorimetry (DSC) is not substantially measured. The phrase heat of fusion (ΔH) is not substantially measured means that no peaks are observed in measurement with a differential scanning calorimeter (DSC) or the heat of fusion measured is 1 J/g or less. The melting point (Tm) and heat of fusion (ΔH) of (C) ethylene-α-olefin copolymer are obtained by carrying out differential scanning calorimeter (DSC) measurement, and analyzing a DSC curve obtained when a specimen is cooled to −100° C., and then raised to 150° C. at a rate of temperature rise of 10° C./min, referring to JIS K7121. If the melting point is not observed, no crystalline components are generated at a low temperature, thereby inhibiting a rise in low temperature viscosity, and the lubricating oil composition has excellent low temperature viscosity characteristics.

Examples of an α-olefin used in the (C) ethylene-α-olefin copolymer can include linear or branched C3-C20 α-olefins such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, and vinylcyclohexane. The α-olefin is preferably a linear or branched C3-C10 α-olefin, more preferably propylene, 1-butene, 1-hexene, and 1-octene, and most preferably propylene from the standpoint of shear stability of the lubricating oil with the resulting copolymer. These α-olefins can be used singly or in combinations of two or more thereof.

Polymerization can also proceed by coexisting in the reaction system at least one type of other monomer selected from the group consisting of a polar group-containing monomer, an aromatic vinyl compound, and a cyclic olefin. Another monomer can be used, for example, in an amount of 20 parts by mass or less and preferably 10 parts by mass or less, based on 100 parts by mass in total of ethylene and a C3-C20 α-olefin.

Examples of the polar group-containing monomer can include α-β-unsaturated carboxylic acids such as acrylic acid, methacrylic acid, fumaric acid, and maleic anhydride, and metal salts such as sodium salts thereof, α-β-unsaturated carboxylic esters such as methyl acrylate, ethyl acrylate, n-propyl acrylate, methyl methacrylate, and ethyl methacrylate, vinyl esters such as vinyl acetate and vinyl propionate, and unsaturated glycidyl esters such as glycidyl acrylate and glycidyl methacrylate.

Examples of the aromatic vinyl compound can include styrene, o-methylstyrene, m-methylstyrene, p-methylstyrene, o, p-dimethylstyrene, methoxystyrene, vinyl benzoate, vinyl methyl benzoate, vinyl benzyl acetate, hydroxystyrene, p-chlorostyrene, divinylbenzene, α-methylstyrene, allylbenzene, for example.

Examples of the cyclic olefin can include C3-C30 cyclic olefins such as cyclopentene, cycloheptene, norbornene, 5-methyl-2-norbornene, and tetracyclododecene and preferably C3-C20 cyclic olefins.

A method for producing an (C) ethylene-α-olefin copolymer in the present invention is not particularly limited, but includes methods such as those described in JPH2-1163B and JPH2-7998B wherein using a vanadium-based catalyst composed of a vanadium compound and an organoaluminum compound. As a method for producing a copolymer with high polymerization activity, methods using a catalyst system composed of a metallocene compound such as zirconocene and organoaluminum oxy compounds (aluminoxanes) as described in JPS61-221207A, JPH7-121969B, and JP2796376B can be employed. This method can reduce the chlorine content of the resulting copolymer and 2,1-insertion of propylene, which is more preferred. The method by the vanadium-based catalyst uses more chlorine compounds as an auxiliary catalyst than the method using the metallocene-based catalyst, whereby a trace amount of chlorine may remain in the resulting (C) ethylene-α-olefin copolymer.

The method using the metallocene-based catalyst, on the other hand, leaves no residual chlorine substantially, eliminating the need to consider the possibility of corrosion of metal parts in machines, for example. The chlorine content is preferably 100 ppm or less, more preferably 50 ppm or less, still more preferably 20 ppm or less, and particularly preferably 5 ppm or less. The chlorine content can be quantified by various known methods. Specific measurement methods in the present invention are as described in Examples.

The reduction of 2,1-insertion of propylene can further decrease the amount of ethylene chain in a copolymer molecule and inhibit intramolecular crystallinity of ethylene, thereby enabling improvement on the viscosity/temperature characteristics and the low temperature viscosity characteristics of the lubricating oil composition. The amount of 2,1-insertion of propylene is determined by analysis of $^{13}$C-NMR measurement according to the method described in JPH7-145212A, and the amount is preferably less than 1%, more preferably 0 to 0.5%, and more preferably 0 to 0.1%. Particularly preferably no peak is observed in a range of 15.0 to 17.5 ppm.

In particular, by using the following method, an (C) ethylene-α-olefin copolymer having a favorable performance balance in terms of molecular weight control, molecular weight distribution, amorphous properties, and the B-value, can be obtained.

The (C) ethylene-α-olefin copolymer can be produced by copolymerizing, typically solution polymerizing, ethylene and a C3-C20 α-olefin in the presence of an olefin polymerization catalyst including a bridged metallocene compound (a) represented by the general formula [I] below, and at least one compound (b) selected from the group consisting of an organometallic compound (b-1), an organoaluminum oxy compound (b-2), and a compound (b-3) that reacts with the bridged metallocene compound (a) to form an ion pair.

[Chem. 2]

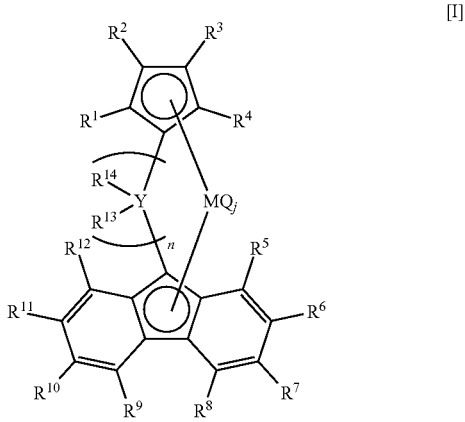

<Bridged Metallocene Compound>

The bridged metallocene compound (a) is represented by formula [I] above. Y, M, $R^1$ to $R^{14}$, Q, n, and j in Formula [I] will be explained below.

(Y, M, $R^1$ to $R^{14}$, Q, n, and j)

Y is a Group XIV atom, is, for example, a carbon atom, a silicon atom, a germanium atom, or a tin atom, and is preferably a carbon atom or a silicon atom, more preferably a carbon atom.

M is a titanium atom, a zirconium atom, or a hafnium atom, preferably a zirconium atom.

$R^1$ to $R^{12}$ are each an atom or a substituent selected from the group consisting of a hydrogen atom, a C1-C20 hydrocarbon group, a silicon-containing hydrocarbon group, a nitrogen-containing group, an oxygen-containing group, a halogen atom, and a halogen-containing group, and may be the same as or different from each other. The substituents $R^1$ to $R^{12}$ that are adjacent to each other may also be bonded together to form a ring or may not be bonded to each other.

Among them, one preferred aspect thereof is that $R^6$ and $R^{11}$ are identical to each other and are each a hydrogen atom, a C1-C20 hydrocarbon group, or a silicon-containing hydrocarbon group.

In another one preferred aspect, $R^7$ and $R^{10}$ are identical to each other and are each a hydrogen atom, a C1-C20 hydrocarbon group, or a silicon-containing hydrocarbon group.

The other one preferred aspect is also that $R^6$, $R^7$, $R^{10}$, and $R^{11}$ are not simultaneously hydrogen atoms.

In each of the preferred aspects described above, $R^6$ and $R^7$ may be bonded to a C2-C3 carbon hydrocarbon to form a ring structure, and $R^{10}$ and Rill may be bonded to a C2-C3 carbon hydrocarbon to form a ring structure.

Examples of the C1-C20 hydrocarbon group include C1-C20 alkyl groups, C3-C20 cyclic saturated hydrocarbon groups, C2-C20 linear unsaturated hydrocarbon groups, C3-C20 cyclic unsaturated hydrocarbon groups, C1-C20 alkylene groups and C6-C20 arylene groups.

Examples of the C1-C20 alkyl groups include linear saturated hydrocarbon groups such as a methyl group, an ethyl group, a n-propyl group, an allyl group, a n-butyl group, a n-pentyl group, a n-hexyl group, a n-heptyl group, a n-octyl group, a n-nonyl group and a n-decanyl group, and branched saturated hydrocarbon groups such as an isopropyl group, an isobutyl group, a s-butyl group, a t-butyl group, a t-amyl group, a neopentyl group, a 3-methylpentyl group, a 1,1-diethylpropyl group, a 1,1-dimethylbutyl group, a 1-methyl-1-propylbutyl group, a 1,1-propylbutyl group, a 1,1-dimethyl-2-methylpropyl group, a 1-methyl-1-isopropyl-2-methylpropyl group, and a cyclopropylmethyl group. The number of carbon atoms in such an alkyl group is preferably 1 to 6.

Examples of the C3-C20 cyclic saturated hydrocarbon groups include cyclic saturated hydrocarbon groups such as a cyclopropyl group, a cyclobutyl group, a cyclopentyl group, a cyclohexyl group, a cycloheptyl group, a cyclooctyl group, a norbornenyl group, a 1-adamantyl group and a 2-adamantyl group, and cyclic saturated hydrocarbon groups in which any hydrogen atom is replaced with a C1-C17 hydrocarbon group, such as a 3-methylcyclopentyl group, a 3-methylcyclohexyl group, a 4-methylcyclohexyl group, a 4-cyclohexylcyclohexyl group and a 4-phenylcyclohexyl group. The number of carbon atoms in such a cyclic saturated hydrocarbon group is preferably 5 to 11.

Examples of the C2-C20 linear unsaturated hydrocarbon groups include alkenyl groups such as an ethenyl group (vinyl group), a 1-propenyl group, a 2-propenyl group (allyl group) and a 1-methylethenyl group (isopropenyl group), and alkynyl groups such as an ethynyl group, a 1-propynyl group and a 2-propynyl group (propargyl group). The number of carbon atoms in such a linear unsaturated hydrocarbon group is preferably 2 to 4.

Examples of the C3-C20 cyclic unsaturated hydrocarbon groups include cyclic unsaturated hydrocarbon groups such as a cyclopentadienyl group, a norbornyl group, a phenyl group, a naphthyl group, an indenyl group, an azulenyl group, a phenanthryl group and an anthracenyl group, cyclic unsaturated hydrocarbon groups in which any hydrogen atom is replaced with a C1-C15 hydrocarbon group, such as a 3-methylphenyl group (m-tolyl group), a 4-methylphenyl group (p-tolyl group), a 4-ethylphenyl group, a 4-t-butylphenyl group, a 4-cyclohexylphenyl group, a biphenylyl group, a 3,4-dimethylphenyl group, a 3,5-dimethylphenyl group and a 2,4,6-trimethylphenyl group (mesityl group), and linear hydrocarbon groups or branched saturated hydrocarbon groups in which any hydrogen atom is replaced with a C3-C19 cyclic saturated hydrocarbon group or cyclic unsaturated hydrocarbon group, such as a benzyl group and a cumyl group. The number of carbon atoms in such a cyclic unsaturated hydrocarbon group is preferably 6 to 10.

Examples of the C1-C20 alkylene groups include a methylene group, an ethylene group, a dimethylmethylene group (isopropylidene group), an ethylmethylene group, a methylethylene group and a n-propylene group. The number of carbon atoms in such an alkylene group is preferably 1 to 6.

Examples of the C6-C20 arylene groups include an o-phenylene group, a m-phenylene group, a p-phenylene group and a 4,4'-biphenylylene group. The number of carbon atoms in such an arylene group is preferably 6 to 12.

Examples of the silicon-containing group include C1-C20 hydrocarbon groups in which any carbon atom is replaced with a silicon atom, for example, alkylsilyl groups such as a trimethylsilyl group, a triethylsilyl group, a t-butyldimethylsilyl group and a triisopropylsilyl group, arylsilyl groups such as a dimethylphenylsilyl group, a methyldiphenylsilyl group and a t-butyldiphenylsilyl group, and a pentamethyldisilanyl group and a trimethylsilylmethyl group. The number of carbon atoms in such an alkylsilyl group is preferably 1 to 10, and the number of carbon atoms in such an arylsilyl group is preferably 6 to 18.

Examples of the nitrogen-containing group include an amino group, and include a group in which a =CH— structural unit in the above C1 to C20 hydrocarbon groups or the above silicon-containing groups is replaced with a nitrogen atom, a group in which a —CH$_2$— structural unit in the above C1 to C20 hydrocarbon groups or the above silicon-containing groups is replaced with a nitrogen atom to which a C1 to C20 hydrocarbon groups is bonded, and a group in which a —CH$_3$ structural unit in the above C1 to C20 hydrocarbon groups or the above silicon-containing groups is replaced with a nitrogen atom to which a C1 to C20 hydrocarbon groups is bonded or a nitrile group, for example, a dimethylamino group, a diethylamino group, an N-morpholinyl group, a dimethylaminomethyl group, a cyano group, a pyrrolidinyl group, a piperidinyl group, and a pyridinyl group, for example, and a N-morpholinyl group and a nitro group. The nitrogen-containing group is preferably a dimethylamino group or an N-morpholinyl group.

Examples of the oxygen-containing group include a hydroxide group, and include in the C1 to C20 hydrocarbon groups, the silicon-containing groups, or the nitrogen-containing groups, as described above, a methoxy group, an ethoxy group, a t-butoxy group, a phenoxy group, a trimethylsiloxy group, a methoxyethoxy group, a hydroxymethyl group, a methoxymethyl group, an ethoxymethyl group, t-butoxymethyl group, a 1-hydroxyethyl group, a 1-methoxyethyl group, a 1-ethoxyethyl group, a 2-hydroxyethyl group, a 2-methoxyethyl group, an 2-ethoxyethyl group, a n-2-oxabutylene group, a n-2-oxapentylene group, a n-3-oxapentylene group, an aldehyde group, an acetyl group, a propionyl group, a benzoyl group, a trimethylsilylcarbonyl group, a carbamoyl group, a methylaminocarbonyl group, a carboxy group, a methoxycarbonyl group, a carboxymethyl group, an ethocarboxymethyl group, a carbamoylmethyl group, a furanyl group, and a pyranyl group, for example, each of which is a group in which a —CH$_2$— structural unit is replaced with an oxygen atom or a carbonyl group, or a group in which a —CH$_3$ structural unit is replaced with an oxygen atom to which a C1 to C20 hydrocarbon group is bonded. The oxygen-containing group is preferably a methoxy group.

Examples of the halogen atom include Group XVII atoms such as fluorine, chlorine, bromine, and iodine. Examples of the halogen-containing group include the above C1-C20 hydrocarbon groups, silicon-containing groups, nitrogen-containing groups, or oxygen-containing groups, in which any hydrogen atom is substituted with a halogen atom, such as a trifluoromethyl group, a tribromomethyl group, a pentafluoroethyl group and a pentafluorophenyl group.

Q is selected as a combination of the same or different members of a halogen atom, a C1-C20 hydrocarbon group, an anion ligand, and a neutral ligand capable of coordinating to a lone electron pair.

The details of the halogen atom and the C1-C20 hydrocarbon group are as described above. When Q is the halogen atom, Q is preferably a chlorine atom. When Q is the C1-C20 hydrocarbon group, the number of carbon atoms in the hydrocarbon group is preferably 1 to 7.

Examples of the anion ligand can include alkoxy groups such as a methoxy group, a t-butoxy group, and a phenoxy group, carboxylate groups such as acetate and benzoate, and sulfonate groups such as methylate and tosylate.

Examples of the neutral ligand capable of coordinating to a lone electron pair can include phosphororganic compounds such as trimethylphosphine, triethylphosphine, triphenylphosphine and diphenylmethylphosphine, and ether compounds such as tetrahydrofuran, diethyl ether, dioxane, and 1,2-dimethoxyethane.

j is an integer of 1 to 4, and is preferably 2.

n is an integer of 1 to 4, preferably 1 or 2, further preferably 1.

$R^{13}$ and $R^{14}$ are each an atom or a substituent selected from the group consisting of a hydrogen atom, a C1 to C20 hydrocarbon group, an aryl group, a substituted aryl group, a silicon-containing group, a nitrogen-containing group, an oxygen-containing group, a halogen atom and a halogen-containing group, and $R^{13}$ and $R^{14}$ may be the same as or different from each other. Moreover, $R^{13}$ and $R^{14}$ may be bonded to each other to form a ring or may not be bonded to each other. One preferred aspect of $R^{13}$ and $R^{14}$ is that they are each independently an aryl group.

The details of the C1-C20 hydrocarbon group, the silicon-containing group, the nitrogen-containing group, the oxygen-containing group, the halogen atom and the halogen-containing group are as described above.

Examples of the aryl group are partially overlapped with examples of the C3-C20 cyclic unsaturated hydrocarbon groups, and can include aromatic compound-derived substituents such as a phenyl group, a 1-naphthyl group, a 2-naphthyl group, an anthracenyl group, a phenanthrenyl group, a tetracenyl group, a chrysenyl group, a pyrenyl group, an indenyl group, an azulenyl group, a pyrrolyl group, a pyridyl group, a furanyl group and a thiophenyl group. The aryl group is preferably a phenyl group or a 2-naphthyl group.

Examples of the aromatic compound include aromatic hydrocarbon and heterocyclic aromatic compounds, such as benzene, naphthalene, anthracene, phenanthrene, tetracene, chrysene, pyrene, indene, azulene, pyrrole, pyridine, furan and thiophene.

Examples of such a substituted aryl group are partially overlapped with examples of the C3-C20 cyclic unsaturated hydrocarbon groups, and include groups, in which one or more hydrogen atoms in the aryl group are each substituted with at least one substituent selected from the group consisting of a C1-C20 hydrocarbon group, an aryl group, a silicon-containing group, a nitrogen-containing group, an oxygen-containing group, a halogen atom and a halogen-containing group, and specifically include a 3-methylphenyl group (m-tolyl group), a 4-methylphenyl group (p-tolyl group), a 3-ethylphenyl group, a 4-ethylphenyl group, a 3,4-dimethylphenyl group, a 3,5-dimethylphenyl group, a biphenylyl group, a 4-(trimethylsilyl)phenyl group, a 4-aminophenyl group, a 4-(dimethylamino)phenyl group, a 4-(diethylamino)phenyl group, a 4-morpholinylphenyl group, a 4-methoxyphenyl group, a 4-ethoxyphenyl group, a 4-phenoxyphenyl group, a 3,4-dimethoxyphenyl group, a 3,5-dimethoxyphenyl group, a 3-methyl-4-methoxyphenyl group, a 3,5-dimethyl-4-methoxyphenyl group, a 3-(trifluoromethyl)phenyl group, a 4-(trifluoromethyl)phenyl group, a 3-chlorophenyl group, a 4-chlorophenyl group, a 3-fluorophenyl group, a 4-fluorophenyl group, a 5-methylnaphthyl group and a 2-(6-methyl)pyridyl group.

In the bridged metallocene compound (a) represented by formula [I] above, n is preferably 1. Such a bridged metallocene compound (hereinafter also referred to as "bridged metallocene compound (a-1)") is represented by the following general formula [II]:

[Chem. 3]

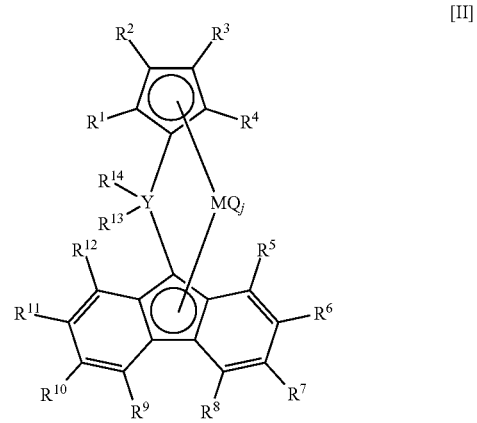

[II]

In Formula [II], the definitions, for example, of Y, M, $R^1$ to $R^{14}$, Q and j are as described above.

This bridged metallocene compound (a-1) allows production steps to be simplified and production cost to be lowered, compared to a compound in which n in formula [I] above is an integer of 2 to 4, and furthermore, use of this bridged metallocene compound (a-1) provides an advantage of production cost of the (C) ethylene-α-olefin copolymer being lowered.

In the bridged metallocene compound (a-1) represented by formula [II] above, one preferred aspect is a bridged metallocene compound represented by the following definition (this bridged metallocene compound is also called a bridged metallocene compound (a-1'), and the bridged metallocene compound (a-1') corresponds to the compound represented by formula [II]-1 described above).

$R^6$ and $R^{11}$ are identical to each other and are each a hydrogen atom, a C1-C20 hydrocarbon group, or a silicon-containing hydrocarbon group.

$R^7$ and $R^{10}$ are identical to each other and are each a hydrogen atom, a C1-C20 hydrocarbon group or a silicon-containing hydrocarbon group.

$R^6$, $R^7$, $R^{10}$ and $R^{11}$ are not simultaneously hydrogen atoms.

$R^6$ and $R^7$ are optionally bonded with a C2-C3 hydrocarbon to form a ring structure.

$R^{10}$ and $R^{11}$ are optionally bonded with a C2-C3 hydrocarbon to form a ring structure.

$R^{13}$ and $R^{14}$ are each independently an aryl group.

In the bridged metallocene compound (a-1) represented by formula [II] above, $R^1$, $R^2$, $R^3$ and $R^4$ are preferably all hydrogen. Such a bridged metallocene compound (hereinafter also referred to as "bridged metallocene compound (a-2)") is represented by the following general formula [III].

[Chem. 4]

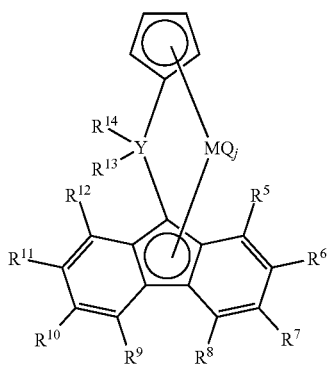

[III]

In Formula [III], the definitions, for example, of Y, M, $R^5$ to $R^{14}$, Q and j are as described above.

The bridged metallocene compound (a-2) allows production steps to be simplified and production cost to be lowered, compared to the compound in which any one or more of $R^1$, $R^2$, $R^3$, and $R^4$ in formula [I] above is substituted with a substituent other than a hydrogen atom, and furthermore, use of this bridged metallocene compound (a-2) provides an advantage of the production cost of the (C) ethylene-α-olefin copolymer being lowered. Moreover, high temperature polymerization has been generally known to decrease randomness of the (C) ethylene-α-olefin copolymer, however, in a case in which ethylene and one or more types of monomers selected from C3-C20 α-olefins are copolymerized in the presence of an olefin polymerization catalyst containing the bridged metallocene compound (a-2), an advantage of high randomness of the obtained (C) ethylene-α-olefin copolymer even in high temperature polymerization, is obtained.

In the bridged metallocene compound (a-2) represented by formula [III] above, either one of $R^{13}$ and $R^{14}$ is preferably an aryl group or a substituted aryl group. Such a bridged metallocene compound (a-3) provides an advantage that the amount of double bonds in the generated (C) ethylene-α-olefin copolymer is smaller than when both $R^{13}$ and $R^{14}$ are substituents other than aryl groups and substituted aryl groups.

In the bridged metallocene compound (a-3), further preferably either one of $R^{13}$ and $R^{14}$ is an aryl group or a substituted aryl group and the other is a C1-C20 alkyl group, and particularly preferably either one of $R^{13}$ and $R^{14}$ is an aryl group or a substituted aryl group and the other is methyl group. Such a bridged metallocene compound (hereinafter also referred to as "bridged metallocene compound (a-4)") allows a balance between the amount of double bonds and polymerization activity in an (C) ethylene-α-olefin copolymer formed to be more excellent, compared to the case where both $R^{13}$ and $R^{14}$ are both aryl groups or substituted aryl groups, and use of this bridged metallocene compound provides an advantage of the production cost of the (C) ethylene-α-olefin copolymer being lowered.

In a case in which polymerization is carried out under the conditions of constant total pressure and temperature in a polymerizer, an increase in hydrogen partial pressure due to hydrogen introduction results in a decrease in partial pressure of olefin that is a polymerized monomer, particularly causing reduction of a polymerization rate in a region where hydrogen partial pressure is high. Since the total internal pressure allowed in the polymerization vessel is limited due to its design, particularly when an excessive hydrogen is required to be introduced upon producing a low molecular weight olefin polymer, olefin partial pressure is significantly reduced, which may reduce the polymerization activity. However, when the bridged metallocene compound (a-4) is used to produce the (C) ethylene-α-olefin copolymer in the present invention, the amount of hydrogen introduced in the polymerization vessel is reduced and the polymerization activity is improved, compared to the case of using the above bridged metallocene compound (a-3), whereby an advantage of the production cost of the (C) ethylene-α-olefin copolymer being reduced is obtained.

In the above bridged metallocene compound (a-4), $R^6$ and $R^{11}$ are preferably C1-C20 alkyl groups and C1-C20 alkylene groups, which may be bonded to an adjacent substituent to form a ring. Such a bridged metallocene compound (hereinafter referred to as a "bridged metallocene compound (a-5)") simplifies the production process more and further reduces the production cost, compared to a compound in which $R^6$ and $R^{11}$ are substituted with substituents other than the C1-C20 alkyl groups and the C1-C20 alkylene groups, and furthermore use of this bridged metallocene compound (a-5) provides an advantage of the production cost of (C) ethylene-α-olefin copolymer being reduced.

In the bridged metallocene compound (a) represented by the general formula [I] above, the bridged metallocene compound (a-1) represented by the general formula [II], the bridged metallocene compound (a-2) represented by the general formula [III], and the above bridged metallocene compounds (a-3), (a-4) and (a-5), M is preferably a zirconium atom. In a case in which ethylene and one or more types of monomers selected from C3-C20 α-olefins are copolymerized in the presence of an olefin polymerization catalyst containing the above bridged metallocene compound wherein M is a zirconium atom, the polymerization activity is higher than when M is a titanium atom or a hafnium atom, whereby an advantage of the production cost of (C) ethylene-α-olefin copolymer being reduced, is obtained.

Examples of such a bridged metallocene compound (a) include [dimethylmethylene ($\eta^5$-cyclopentadienyl) ($\eta^5$-fluorenyl)]zirconium dichloride, [dimethylmethylene ($\eta^5$-cyclopentadienyl) ($\eta^5$-2,7-di-t-butylfluorenyl)] zirconium dichloride, [dimethylmethylene ($\eta^5$-cyclopentadienyl) ($\eta^5$-3,6-di-t-butylfluorenyl)] zirconium dichloride, [dimethylmethylene ($\eta^5$-cyclopentadienyl) ($\eta^5$-octamethyloctahydrodibenzofluorenyl)] zirconium dichloride, [dimethylmethylene ($\eta^5$-cyclopentadienyl) ($\eta^5$-tetramethyloctahydrodibenzofluorenyl)] zirconium dichloride, [cyclohexylidene ($\eta^5$-cyclopentadienyl) (η⁵-fluorenyl)]zirconium dichloride, [cyclohexylidene (η⁵-cyclopentadienyl) (η⁵-2,7-di-t-butylfluorenyl)] zirconium dichloride, [cyclohexylidene (η⁵-cyclopentadienyl) (η⁵-3,6-di-t-butylfluorenyl)]zirconium dichloride, [cyclohexylidene (η⁵-cyclopentadienyl) (η⁵-octamethyloctahydrodibenzofluorenyl)] zirconium dichloride, [cyclohexylidene (η⁵-cyclopentadienyl) (η⁵-tetramethyloctahydrodibenzofluorenyl)] zirconium dichloride, [diphenylmethylene (η⁵-cyclopentadienyl) (η⁵-fluorenyl)]zirconium dichloride, [diphenylmethylene (η⁵-cyclopentadienyl) (η⁵-2,7-di-t-butylfluorenyl)] zirconium dichloride, [diphenylmethylene (η⁵-2-methyl-4-t-butylcyclopentadienyl) (η⁵-2,7-di-t-butylfluorenyl)] zirconium dichloride, [diphenylmethylene (η⁵-cyclopentadienyl) (η⁵-3,6-di-t-butylfluorenyl)] zirconium dichloride, [diphenylmethylene (η⁵-cyclopentadienyl) (η⁵-octamethyloctahydrodibenzofluorenyl)] zirconium dichloride, [diphenylmethylene{η⁵-(2-methyl-4-1-propylcyclopentadienyl)} (η⁵-octamethyloctahydrodibenzofluorenyl)] zirconium dichloride, [diphenylmethylene (η⁵-cyclopentadienyl) (η⁵-tetramethyloctahydrodibenzofluorenyl)] zirconium dichloride, [methylphenylmethylene (η⁵-cyclopentadienyl) (η⁵-fluorenyl)]zirconium dichloride, [methylphenylmethylene (η⁵-cyclopentadienyl) (η⁵-2,7-di-t-butylfluorenyl)]zirconium dichloride, [methylphenylmethylene (η⁵-cyclopentadienyl) (η⁵-3,6-di-t-butylfluorenyl)] zirconium dichloride, [methylphenylmethylene (η⁵-cyclopentadienyl) (η⁵-octamethyloctahydrodibenzofluorenyl)] zirconium dichloride, [methylphenylmethylene (η⁵-cyclopentadienyl) (η⁵-tetramethyloctahydrodibenzofluorenyl)] zirconium dichloride, [methyl (3-methylphenyl)methylene (η⁵-cyclopentadienyl) (η⁵-fluorenyl)]zirconium dichloride, [methyl (3-methylphenyl)methylene (η⁵-cyclopentadienyl) (η⁵-2,7-di-t-butylfluorenyl)] zirconium dichloride, [methyl (3-methylphenyl)methylene (η⁵-cyclopentadienyl) (η⁵-3,6-di-t-butylfluorenyl)] zirconium dichloride, [methyl (3-methylphenyl)methylene (η⁵-cyclopentadienyl) (η⁵-octamethyloctahydrodibenzofluorenyl)] zirconium dichloride, [methyl (3-methylphenyl)methylene (η⁵-cyclopentadienyl) (η⁵-tetramethyloctahydrodibenzofluorenyl)] zirconium dichloride, [diphenylsilylene (η⁵-cyclopentadienyl) (η⁵-fluorenyl)]zirconium dichloride, [diphenylsilylene (η⁵-cyclopentadienyl) (η⁵-2,7-di-t-butylfluorenyl)] zirconium dichloride, [diphenylsilylene (η⁵-cyclopentadienyl) (η⁵-3,6-di-t-butylfluorenyl)]zirconium dichloride, [diphenylsilylene (η⁵-cyclopentadienyl) (η⁵-octamethyloctahydrodibenzofluorenyl)] zirconium dichloride, [diphenylsilylene (η⁵-cyclopentadienyl) (η⁵-tetramethyloctahydrodibenzofluorenyl)] zirconium dichloride, [bis(3-methylphenyl) silylene (η⁵-cyclopentadienyl) (η⁵-fluorenyl)] zirconium dichloride, [bis(3-methylphenyl) silylene (η⁵-cyclopentadienyl) (η⁵-2,7-di-t-butylfluorenyl)] zirconium dichloride, [bis(3-methylphenyl) silylene (η⁵-cyclopentadienyl) (η⁵-3,6-di-t-butylfluorenyl)] zirconium dichloride, [bis(3-methylphenyl) silylene (η⁵-cyclopentadienyl) (η⁵-octamethyloctahydrodibenzofluorenyl)] zirconium dichloride, [bis(3-methylphenyl) silylene (η⁵-cyclopentadienyl) (η⁵-tetramethyloctahydrodibenzofluorenyl)] zirconium dichloride, [dicyclohexylsilylene (η⁵-cyclopentadienyl) (η⁵-fluorenyl)] zirconium dichloride, [dicyclohexylsilylene (η⁵-cyclopentadienyl) (η⁵-2,7-di-t-butylfluorenyl)]zirconium dichloride, [dicyclohexylsilylene (η⁵-cyclopentadienyl) (η⁵-3,6-di-t-butylfluorenyl)]zirconium dichloride, [dicyclohexylsilylene (η⁵-cyclopentadienyl) (η⁵-octamethyloctahydrodibenzofluorenyl)] zirconium dichloride, [dicyclohexylsilylene (η⁵-cyclopentadienyl) (η⁵-tetramethyloctahydrodibenzofluorenyl)] zirconium dichloride, [ethylene (η⁵-(cyclopentadienyl) (η⁵-fluorenyl) zirconium dichloride, [ethylene (η⁵-clopentadienyl) (η⁵-(2,7-di-t-butylfluorenyl)] zirconium dichloride, [ethylene (η⁵-clopentadienyl) (η⁵-(3,6-di-t-butylfluorenyl)]zirconium dichloride, [ethylene (η⁵-cyclopentadienyl) (η⁵-octamethyloctahydrodibenzofluorenyl) zirconium dichloride, [ethylene (η⁵-cyclopentadienyl) (η⁵-tetramethyloctahydrodibenzofluorenyl)] zirconium dichloride, for example.

Examples of the bridged metallocene compound (a) include compounds obtained by replacing the zirconium atom of these compounds with a hafnium atom and compounds obtained by replacing the chloro ligand with a methyl group, but the bridged metallocene compound (a) is not limited thereto. Herein, η⁵-tetramethyloctahydrodibenzofluorenyl and η⁵-octamethyloctahydrodibenzofluorenyl, as constituent moieties of the bridged metallocene compound (a) exemplified, respectively represent a 4,4,7,7-tetramethyl-(5a, 5b, 11a, 12,12a-η⁵)-1,2,3,4,7,8,9,10-octahydrodibenzo[b, H] fluorenyl group and a 1,1,4,4,7,7,10,10-octamethyl-(5a,5b,11a,12,12a-η⁵)-1,2,3,4,7,8,9,10-octahydrodibenzo[b, H] fluorenyl group.

<Compound (b)>

A polymerization catalyst used in the present invention contains the above bridged metallocene compound (a) and at least one compound (b) selected from the group consisting of an organometallic compound (b-1), an organoaluminum oxy compound (b-2), and a compound (b-3) that reacts with the bridged metallocene compound (a) to form an ion pair.

As the organometallic compound (b-1), specifically, the following organometallic compounds of Groups I and II and Groups XII and XIII of the periodic table, are used.

(b-1a) an Organoaluminum Compound Represented by the General Formula

wherein in the formula, $R^a$ and $R^b$ may be the same as or different from each other and represent a C1-C15 hydrocarbon group, preferably a C1-C4 hydrocarbon group, X represents a halogen atom, m is in a range of $0 < m \le 3$, n is in a range of $0 \le n < 3$, p is in a range of $0 \le p < 3$, q is in a range of $0 \le q < 3$, and $m+n+p+q=3$.

Examples of such a compound can include tri-n-alkylaluminum such as trimethylaluminum, triethylaluminum, tri-n-butylaluminum, tri-n-hexylaluminum and tri-n-octylaluminum, tri-branched alkylaluminum such as triisopropylaluminum, triisobutylaluminum, tri-sec-butylaluminum, tri-t-butylaluminum, tri-2-methylbutylaluminum, tri-3-methylhexylaluminum and tri-2-ethylhexylaluminum, tricycloalkylaluminum such as tricyclohexylaluminum and tricyclooctylaluminum, triarylaluminum such as triphenylaluminum and tri (4-methylphenyl)aluminum, dialkylaluminum hydrides such as diisopropylaluminum hydride and diisobutylaluminum hydride, alkenylaluminum represented by general formula $(i-C_4H_9)_x Al_y(C_5H_{10})_z$ wherein x, y and z are positive numerals and $z \le 2x$, such as isoprenylaluminum, alkylaluminum alkoxides such as isobutylaluminum ethoxide and isobutylaluminum ethoxide, dialkylaluminum alkoxides such as dimethylaluminum methoxide, diethylaluminum ethoxide and dibutylaluminum butoxide, alkylaluminum sesquialkoxides such as ethylaluminum sesquiethoxide and butylaluminum sesquibutoxide, partially alkoxylated alkylaluminum having an average composition represented by the general formula $R^a{}_{2.5}Al(OR^b)_{0.5}$, alkylaluminum aryloxides such as diethylaluminum phenoxide and diethylaluminum (2,6-di-t-butyl-4-methylphenoxide), dialkylaluminum halides such as dimethylaluminum chloride, diethylaluminum chloride, dibutylaluminum chloride, diethylaluminum bromide and diisobutylaluminum chloride, alkylaluminum sesquihalides such as ethylaluminum sesquichloride, butylaluminum sesquichloride and ethylaluminum sesquibromide, partially halogenated alkylaluminum such as an alkylaluminum dihalide such as ethylaluminum dichloride, dialkylaluminum hydrides such as diethylaluminum hydride and dibutylaluminum hydride, alkylaluminum dihydrides such as ethylaluminum dihydride and propylaluminum dihydride and other partially hydrogenated alkylaluminum, and partially alkoxylated and halogenated alkylaluminum such as ethylaluminum ethoxychloride, butylaluminum butoxychloride and ethylaluminum methoxybromide. A compound analogous to those represented by the above general formula $R^a{}_mAl(ORD)_nH_pX_q$ can also be used, and examples thereof can include an organic aluminum compound in which two or more aluminum compounds are bonded via a nitrogen atom. Specific examples of such a compound include $(C_2H_5)_2AlN(C_2H_5)Al(C_2H_5)_2$, for example.

(b-1b) A complex alkylated compound of a Group I metal of the periodic table and aluminum, represented by the general formula $M^2AlR^a{}_4$ wherein in the formula, $M^2$ represents Li, Na or K, and $R^a$ represents a $C_1$-$C_{15}$ hydrocarbon group, preferably a $C_1$-$C_4$ hydrocarbon group.

Examples of such a compound can include $LiAl(C_2H_5)_4$ and $LiAl(C_7H_{15})_4$, for example.

(b-1c) A dialkylated compound of a Group II or Group XII metal of the periodic table, represented by the general formula $R^aR^bM^3$ wherein in the formula, $R^a$ and $R^b$ may be the same as or different from each other and represent a C1-C15 hydrocarbon group, preferably a C1-C4 hydrocarbon group, and $M^3$ is Mg, Zn or Cd.

As the organoaluminum oxy compound (b-2), conventionally known aluminoxanes can be used as they are. Specific examples thereof can include the compound represented by the following general formula [IV] and the compound represented by the following general formula [V].

[Chem. 5]

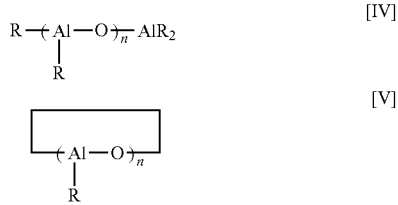

[IV]

[V]

In formulas [IV] and [V], R is a $C_1$-$C_{10}$ hydrocarbon group and n is an integer of 2 or more.

In particular, methylaluminoxane is utilized in which R is a methyl group and n is 3 or more, preferably 10 or more. An organoaluminum compound is allowed to be slightly incorporated in such aluminoxane.

When copolymerization of ethylene and a C3 or higher α-olefin is performed at a high temperature in the present invention, a benzene-insoluble organoaluminum oxy compound exemplified in JP H2-78687A can also be applied. An organoaluminum oxy compound described in JP H2-167305A, or aluminoxane having two or more alkyl groups, described in JP H2-24701A and JP H3-103407A, can also be suitably utilized. The "benzene-insoluble organoaluminum oxy compound" that may be used in the present invention is a compound that usually contains 10% or less, preferably 5% or less, particularly preferably 2% or less of an Al component to be dissolved in benzene at 60° C., in terms of Al atom, and that is insoluble or hardly soluble in benzene.

Examples of the organoaluminum oxy compound (b-2) can also include a modified methylaluminoxane represented by the following general formula [VI], for example.

[Chem. 6]

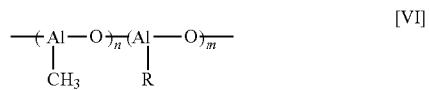

[VI]

In formula [VI], R is a C1-C10 hydrocarbon group, and m and n each independently represent an integer of 2 or more.

This modified methylaluminoxane is prepared by using trimethylaluminum and alkylaluminum other than trimethylaluminum. Such a compound is commonly referred to as MMAO. Such MMAO can be prepared by the methods described in U.S. Pat. No. 960,878 P4 and U.S. Pat. No. 5,041,584. A compound prepared by using trimethylaluminum and triisobutylaluminum, is commercially available from Tosoh-Finechem Corporation, for example, under the names MMAO and TMAO wherein R is an isobutyl group. Such MMAO is aluminoxane with improved solubility in various solvents and storage stability, and is specifically soluble in an aliphatic hydrocarbon or an alicyclic hydrocarbon, unlike the compounds that are insoluble or difficult to be soluble in benzene, among the compounds represented by the above formulae [IV] and that represented by the above formulae [V].

Examples of the organoaluminum oxy compound (b-2) can also include an organoaluminum oxy compound containing boron, represented by the following general formula [VII].

[Chem. 7]

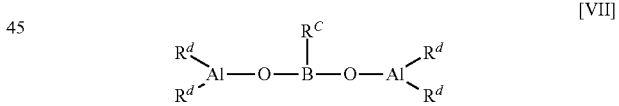

[VII]

In formulas [VII], RC represents a C1-C10 hydrocarbon group. $R^d$ may be the same as or different from each other and represents a hydrogen atom or a C1-C10 hydrocarbon group.

Examples of the compound (b-3) that reacts with the bridged metallocene compound (a) to form an ionic pair (hereinafter may be abbreviated and referred to as "ionized ionic compound" or simply "ionic compound") can include Lewis acids, ionic compounds, borane compounds and carborane compounds, for example, which are described in JPH1-501950A, JPH1-502036A, JPH3-179005A, JPH3-179006A, JPH3-207703A, JPH3-207704A, U.S. Pat. No. 5,321,106, for example. Examples thereof can further include heteropoly compounds and isopoly compounds.

The ionized ionic compound preferably used in the present invention is the boron compound represented by the following general formula [VIII].

[Chem. 8]

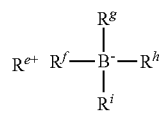

[VIII]

In formula [VIII], examples of $R^{e+}$ includes $H^+$, a carbenium cation, an oxonium cation, an ammonium cation, a phosphonium cation, a cycloheptyltrienyl cation, and a ferrocenium cation with transition metal, for example. $R^f$ to $R^i$ may be the same as or different from each other and are substituents selected from $C_1$-$C_{20}$ hydrocarbon groups, silicon-containing groups, nitrogen-containing groups, oxygen-containing groups, halogen atoms and halogen-containing groups and $R^f$ to $R^i$ are preferably substituted aryl groups.

Specific examples of the carbenium cation include trisubstituted carbenium cations such as triphenylcarbenium cation, tris(4-methylphenyl) carbenium cation and tris(3,5-dimethylphenyl) carbenium cation.

Specific examples of the ammonium cation include trialkyl-substituted ammonium cations such as trimethylammonium cation, triethylammonium cation, tri (n-propyl) ammonium cation, triisopropylammonium cation, tri (n-butyl) ammonium cation and triisobutylammonium cation, N, N-dialkylanilinium cations such as N, N-dimethylanilinium cation, N, N-diethylanilinium cation and N, N-2,4,6-pentamethylanilinium cation, and dialkylammonium cations such as diisopropylammonium cation and dicyclohexylammonium cation.

Specific examples of the phosphonium cation include triarylphosphonium cations such as triphenylphosphonium cation, tris(4-methylphenyl)phosphonium cation and tris(3,5-dimethylphenyl)phosphonium cation.

Ret that is a carbenium cation and an ammonium cation, for example, is preferred among the above specific examples, and particularly a triphenylcarbenium cation, a N, N-dimethylanilinium cation and a N, N-diethylanilinium cation, are preferred.

Examples of compounds containing the carbenium cation as the ionized ionic compounds preferably used in the present invention can include triphenylcarbenium tetraphenylborate, triphenylcarbenium tetrakis(pentafluorophenyl) borate, triphenylcarbenium tetrakis {3,5-di-(trifluoromethyl)phenyl}borate, tris(4-methylphenyl) carbenium tetrakis(pentafluorophenyl) borate and tris(3,5-dimethylphenyl) carbenium tetrakis(pentafluorophenyl) borate.

Examples of compounds containing the trialkyl-substituted ammonium cation as the ionized ionic compounds preferably used in the present invention can include triethylammonium tetraphenylborate, tripropylammonium tetraphenylborate, tri (n-butyl) ammonium tetraphenylborate, trimethylammonium tetrakis (4-methylphenyl) borate, trimethylammonium tetrakis (2-methylphenyl) borate, tri (n-butyl) ammonium tetrakis(pentafluorophenyl) borate, triethylammonium tetrakis(pentafluorophenyl) borate, tripropylammonium tetrakis(pentafluorophenyl) borate, tripropylammonium tetrakis (2,4-dimethylphenyl) borate, tri (n-butyl) ammonium tetrakis (3,5-dimethylphenyl) borate, tri (n-butyl) ammonium tetrakis {4-(trifluoromethyl)phenyl}borate, tri (n-butyl) ammonium tetrakis {3,5-di(trifluoromethyl)phenyl}borate, tri (n-butyl) ammonium tetrakis (2-methylphenyl) borate, dioctadeylmethylammonium tetraphenylborate, dioctadeylmethylammonium tetrakis (4-methylphenyl) borate, dioctadeylmethylammonium tetrakis (4-methylphenyl) borate, dioctadeylmethylammonium tetrakis(pentafluorophenyl) borate, dioctadeylmethylammonium tetrakis (2,4-dimethylphenyl) borate, dioctadeylmethylammonium tetrakis (3,5-dimethylphenyl) borate, dioctadeylmethylammonium tetrakis {4-(trifluoromethyl) phenyl}borate, dioctadeylmethylammonium tetrakis {3,5-di(trifluoromethyl)phenyl}borate and dioctadeylmethylammonium.

Examples of compounds containing a N, N-dialkylanilinium cation as the ionized ionic compounds preferably used in the present invention can include N, N-dimethylanilinium tetraphenylborate, N, N-dimethylanilinium tetrakis(pentafluorophenyl) borate, N, N-dimethylanilinium tetrakis {3,5-di(trifluoromethyl) phenyl}borate, N, N-diethylanilinium tetraphenylborate, N, N-diethylanilinium tetrakis(pentafluorophenyl) borate, N, N-diethylanilinium tetrakis {3,5-di(trifluoromethyl) phenyl}borate, N, N-2,4,6-pentamethylanilinium tetraphenylborate, N, N-2, 4,6-pentamethylanilinium tetrakis (petafluorophenyl) borate, for example.

Examples of compounds containing the dialkylammonium cation as the ionized ionic compounds preferably used in the present invention can include di-n-propylammonium tetrakis(pentafluorophenyl) borate and dicyclohexylammonium tetraphenylborate.

Other ionic compounds exemplified in JP2004-51676A can also be used without any limitation.

The above ionic compound (b-3) may be used singly or combined for use with two or more types thereof.

As the organometallic compound (b-1), trimethylaluminum, triethylaluminum, and triisobutylaluminum, which are readily available as commercial products, are preferred. Of these, triisobutylaluminum is particularly preferred for its handleability.

As the organoaluminum oxy compounds (b-2), methylaluminoxane that is readily available as a commercial product and MMAO prepared with trimethylaluminum and triisobutylaluminum are preferred. Of these, MMAO is particularly preferred because of its improved solubility in various solvents and storage stability.

As the ionic compounds (b-3), triphenylcarbenium tetrakis(pentafluorophenyl) borate and N, N-dimethylanilinium tetrakis(pentafluorophenyl) borate, are preferred because they are readily available as commercial products and significantly contribute to polymerization activity.

As the compounds (b), a combination of triisobutylaluminum and triphenylcarbenium tetrakis(pentafluorophenyl) borate and a combination of triisobutylaluminum and N, N-dimethylanilinium tetrakis(pentafluorophenyl) borate, are particularly preferred because they greatly improve polymerization activity.

<Carrier (c)>

In the present invention, a carrier (c) may be used as a constituent of the olefin polymerization catalyst, if necessary.

The carrier (c) that may be used in the present invention is an inorganic or organic compound, which is a granular or particulate solid. In particular, the inorganic compound is preferably porous oxide, inorganic chloride, clay, clay mineral or an ion-exchangeable layered compound.

As porous oxides, specifically $SiO_2$, $Al_2O_3$, MgO, Zro, $TiO_2$, $B_2O_3$, CaO, ZnO, Bao, and $ThO_2$, for example, or composites or mixtures containing these materials, such as natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO, for example, can be used. Of these, those with $SiO_2$ and/or $Al_2O_3$ as major components are preferred. The properties of such porous oxides vary depending on the type and production methods, but the carrier preferably used in the present invention has a particle size of 0.5 to 300 µm, preferably 1.0 to 200 µm, a specific surface area in a range of 50 to 1000 m$^2$/g, preferably 100 to 700 m$^2$/g, and a pore volume in a range of 0.3 to 3.0 cm$^3$/g. Such a carrier is, if necessary, fired at 100 to 1000° C., preferably 150 to 700° C., and then used.

The inorganic chlorides that are $MgCl_2$, $MgBr_2$, $MnCl_2$, and $MnBr_2$, for example, are used. The inorganic chloride may be used as it is, or may be pulverized by a ball mill or a vibrating mill, and then used. Alternatively, the inorganic chloride, which is dissolved in a solvent such as an alcohol and then precipitated in the form of fine particles by a precipitating agent, may also be used.

Clay is usually constituted with clay mineral as a main component. The ion-exchangeable layered compound is a compound having a crystal structure in which surfaces configured are mutually stacked in parallel by a weak force with, for example, an ionic bond, and includes an exchangeable ion. Most clay mineral corresponds to such an ion-exchangeable layered compound. Such clay, clay mineral, and ion-exchangeable layered compounds here used are not limited to natural products, and can also be artificially synthesized products. Examples of the clay, clay mineral, or the ion-exchangeable layered compound can include clay, clay mineral, and also ion crystalline compounds with layered crystal structures such as hexagonal fine packing type, antimony type, $CdCl_2$ type, and $CdCl_2$ type, for example. Examples of such clay and clay mineral include kaolin, bentonite, Kibushi Clay, Gairome clay, allophane, hisingerite, pyrophyllite, mica group, montmorillonite group, vermiculite, chlorite group, parigorskite, kaolinite, nacrite, dickite, and haloysite, for example, and examples of the ion-exchangeable layered compounds include crystalline acidic salts of polyvalent metals such as $\alpha$-$Zr(HASO_4)_2 \cdot H_2O$, $\alpha$-$Zr(HPO_4)_2$, $\alpha$-$Zr(KPO_4)_2 \cdot 3H_2O$, $\alpha$-$Ti(HPO_4)_2$, $\alpha$-$Ti(HASO_4)_2 \cdot H_2O$, $\alpha$-$Sn(HPO_4)_2 \cdot H_2O$, $\gamma$-$Zr(HPO_4)_2$, $\gamma$-$Ti(HPO_4)_2$, and $\gamma$-$Ti(NH_4PO_4)_2 \cdot H_2O$. The clay and the clay mineral for use in the present invention are also preferably subjected to a chemical treatment. The chemical treatment here used can be any treatment such as a surface treatment for removal of impurities attached to a surface, or a treatment having an effect on the crystal structure of the clay. Specific examples of the chemical treatment include an acid treatment, an alkali treatment, a salt treatment and an organic substance treatment.

The ion-exchangeable layered compound may be a layered compound where a space between layers is enlarged by exchanging an exchangeable ion in the space between layers with another large and bulky ion by means of ion exchangeability. Such a bulky ion serves as a shore supporting a layered structure, and is usually referred to as pillar. Such introduction of another substance (guest compound) into the space between layers in the layered compound is referred to as intercalation. Examples of the guest compound include cationic inorganic compounds such as $TiCl_4$ and $ZrCl_4$, metal alkoxides such as $Ti(OR)_4$, $Zr(OR)_4$, $PO(OR)_3$, and $B(OR)_3$ (R is a hydrocarbon group, for example), and metal hydroxide ions such as $[Al_{13}O_4(OH)_{24}]^{7+}$, $[Zr_4(OH)_{14}]^{2+}$, and $[Fe_3O(OCOCH_3)_6]^+$. Such a compound may be used singly or in combinations of two or more kinds thereof. When intercalating these compounds, a polymerization product obtained by hydrolytic polycondensation of metal alkoxides such as $Si(OR)_4$, $Al(OR)_3$, and $Ge(OR)_4$ (R is a hydrocarbon group, for example), or a colloidal inorganic compound such as $SiO_2$, can be co-present. Examples of the pillar include oxide generated by intercalation of the metal hydroxide ion into the space between layers and then heating and dehydration.

In particular, the clay or the clay mineral is preferable, and montmorillonite, vermiculite, pectolite, tainiolite and synthetic mica are particularly preferable.

Examples of the organic compound as the carrier (c) include a granular or particulate solid with a particle size in a range of 0.5 to 300 µm. Specific examples can include a (co)polymer or vinylcyclohexane generated with as a main component a $C_2$-$C_{14}$ α-olefin such as ethylene, propylene, 1-butene or 4-methyl-1-pentene, a (co)polymer generated with styrene as a main component, and modified products thereof.

A polymerization method using an olefin polymerization catalyst capable of producing the (C) ethylene-α-olefin copolymer with high randomness enables high temperature polymerization. In other words, the use of the olefin polymerization catalyst can inhibit decrease in randomness of the (C) ethylene-α-olefin copolymer formed upon the high temperature polymerization. In solution polymerization, the viscosity of the polymerization solution containing the (C) ethylene-α-olefin copolymer formed decreases at high temperatures, whereby a concentration of (C) ethylene-α-olefin copolymer in a polymerizer can be increased compared to that of low temperature polymerization, resulting in higher productivity per unit of polymerizer. Copolymerization of ethylene and α-olefin in the present invention can be carried out by either liquid-phase polymerization methods such as solution polymerization and suspension polymerization (slurry polymerization) or by gas-phase polymerization methods, however, the solution polymerization is particularly preferred from the viewpoint of maximizing the effects of the present invention in such a manner.

A method of use and order of addition of each component of the olefin polymerization catalyst may be arbitrarily selected. At least two or more components in the catalyst may be contacted with each other in advance.

The bridged metallocene compound (a) (hereinafter also referred to as "component (a)") is usually used in an amount of $10^{-9}$ to $10^{-1}$ moles and preferably $10^{-8}$ to $10^{-2}$ moles per liter of reaction volume.

The organometallic compound (b-1) (hereinafter also referred to as "component (b-1)") is used in an amount such that a molar ratio of the component (b-1) to a transition metal atom (M) in the component (a) [(b-1)/M] is usually 0.01 to 50,000 and preferably 0.05 to 10,000.

The organoaluminum oxy compound (b-2) (hereinafter also referred to as "component (b-2)") is used in an amount such that a molar ratio of an aluminum atom in the component (b-2) to a transition metal atom (M) in the component (a) [(b-2)/M] is usually 10 to 5,000 and preferably 20 to 2,000.

The ionic compound (b-3) (hereinafter also referred to as "component (b-3)") is used in an amount such that a molar ratio of the component (b-3) to a transition metal atom (M) in the component (a) [(b-3)/M] is usually 1 to 10,000 and preferably 1 to 5,000.

The polymerization temperature is usually -50° C. to 300° C., preferably 30 to 250° C., more preferably 100° C. to 250° C., further preferably 130° C. to 200° C. As the temperature in the polymerization temperature region in the above range is higher, the solution viscosity during polymerization is lower, and removal of heat of polymerization is also easier. The polymerization pressure is usually ordinary pressure to 10 MPa-gauge pressure (MPa-G), preferably ordinary pressure to 8 MPa-G.

The polymerization reaction can be carried out in any method of batchwise, semi-continuous, and continuous methods. Such polymerization can also be continuously carried out in two or more polymerization instruments different in reaction conditions.

The molecular weight of the resulting copolymer can be regulated by the changes in hydrogen concentration and polymerization temperature in a polymerization system. Furthermore, the molecular weight can be adjusted according to the amount of component (b) used. In the case of addition of hydrogen, the amount added is properly about 0.001 to 5,000 NL per kg of the copolymer.

The polymerization solvent for use in a liquid phase polymerization method is usually an inert hydrocarbon solvent, and is preferably a saturated hydrocarbon having a boiling point of 50° C. to 200° C. under ordinary pressure. Specific examples of the polymerization solvent include aliphatic hydrocarbons such as propane, butane, pentane, hexane, heptane, octane, decane, dodecane and kerosene oil, and alicyclic hydrocarbons such as cyclopentane, cyclohexane and methylcyclopentane, and particularly preferably include hexane, heptane, octane, decane and cyclohexane. The α-olefin to be polymerized, by itself, can also be used as the polymerization solvent. While an aromatic hydrocarbon such as benzene, toluene or xylene, or a halogenated hydrocarbon such as ethylene chloride, chlorobenzene or dichloromethane can also be used as the polymerization solvent, use thereof is not preferable in terms of a reduction in load on the environment and in terms of minimization of the influence on human health.

The kinematic viscosity at 100° C. of the olefin polymer depends on the molecular weight of the polymer. In other words, a high molecular weight leads to a high viscosity and a low molecular weight leads to a low viscosity, and thus the kinematic viscosity at 100° C. is adjusted by the above molecular weight adjustment. A low molecular weight component in a polymer obtained can be removed by a conventionally known method such as distillation under reduced pressure, to thereby allow for adjustment of the molecular weight distribution (Mw/Mn) of the polymer obtained. The polymer obtained may be further subjected to hydrogen addition (hereinafter, also referred to as hydrogenation.) by a conventionally known method. If the number of double bonds in the polymer obtained by such hydrogenation is reduced, oxidation stability and heat resistance are enhanced.

The resulting (C) ethylene-α-olefin copolymer may be used singly or combined for use with two or more types of those with different molecular weights or with different monomer compositions.

The (C) ethylene-α-olefin copolymer may undergo graft-modification in its functional group and may further undergo secondary modification. Examples of the modification include, for example, the method described in JPS61-126120A and JP2593264B, for example, and examples of the secondary modification include the method described in JP2008-508402A, for example.

[Lubricating Oil Composition for Hydraulic Fluid]

The lubricating oil composition for hydraulic fluid according to the present invention is characterized in that the composition contains: a lubricating oil base oil comprising a (A) mineral oil and/or a (B) synthetic oil; and the aforementioned viscosity modifier for lubricating oil, and that a kinematic viscosity at 40° C. and a viscosity index are within specific ranges.

<(A) Mineral Oil>

The (A) mineral oil has the following characteristics (A1) to (A3).

(A1) A kinematic viscosity at 40° C. is 10 to 100 mm$^2$/s.

The value of this kinematic viscosity at 40° C. was that measured according to the method described in JIS K2283. The kinematic viscosity of (A) mineral oil at 40° C. is 10 to 100 mm$^2$/s, preferably 15 to 80 mm$^2$/s, and more preferably 20 to 60 mm$^2$/s. Within this range of the kinematic viscosity at 40° C., the lubricating oil composition of the present invention is excellent in terms of a balance of volatility and temperature/viscosity characteristics.

(A2) A viscosity index is 90 or more.

The value of this viscosity index was that measured according to the method described in JIS K2283. The viscosity index of (A) mineral oil is 90 or more, preferably 100 or more and more preferably 105 or more. Within this range of the viscosity index, the lubricating oil composition of the present invention is excellent in temperature/viscosity characteristics.

(A3) A pour point is 0° C. or lower.

The value of this pour point is that measured according to the method described in ASTM D97. The pour point of (A) mineral oil is 0° C. or lower, preferably −5° C. or lower, more preferably −10° C. or lower, and further preferably −12° C. or lower. Within this range of the pour point, the lubricating oil composition of the present invention is excellent in low temperature viscosity characteristics.

<(B) Synthetic Oil>

(B) Synthetic oil has the following characteristics (B1) to (B3).

(B1) A kinematic viscosity at 40° C. is 4 to 100 mm$^2$/s.

The value of this kinematic viscosity at 40° C. was that measured according to the method described in JIS K2283. The kinematic viscosity of (B) synthetic oil at 40° C. is 4 to 100 mm$^2$/s, preferably 4.5 to 80 mm$^2$/s, and more preferably 10 to 60 mm$^2$/s. Within this range of the kinematic viscosity at 40° C., the lubricating oil composition of the present invention is excellent in terms of a balance of volatility and temperature/viscosity characteristics.

(B2) A Viscosity Index is 90 or More.

The value of this viscosity index was that measured according to the method described in JIS K2283. The viscosity index of (B) synthetic oil is 90 or more, preferably 110 or more, more preferably 115 or more, and further preferably 120 or more. Within this range of the viscosity index, the lubricating oil composition of the present invention is excellent in temperature/viscosity characteristics.

(B3) A Pour Point is −30° C. or Lower.

The value of this pour point is that measured according to the method described in ASTM D97. The pour point of (B) synthetic oil is −30° C. or lower, preferably −40° C. or lower, more preferably −50° C. or lower, and further preferably −60° C. or lower. Within this range of the pour point, the lubricating oil composition of the present invention is excellent in low temperature viscosity characteristics.

The lubricating oil base oil used in the present invention is different in its performance and quality, such as viscosity characteristics, heat resistance, and oxidation stability, depending on its production methods and refining methods, for example, however, the lubricating oil base oil is generally classified into mineral oil and synthetic oil. In the American Petroleum Institute (API), lubricating oil base oil is also classified into five categories: Group I, II, III, IV, and V. These API categories are defined in API Publication 1509, 15th Edition, Appendix E, April 2002 and are as shown in Table 1. The (A) mineral oil can be any of Groups I to III in the API categories, and the (B) synthetic oil can be any of Groups IV and V in the API categories. The details will be described below:

TABLE 1

| Group | Oil type | Viscosity index *[1] | Saturated hydrocarbon component *[2] (vol %) | Sulfur fraction amount *[3] (% by weight) |
|---|---|---|---|---|
| I | Mineral oil | 80-120 | <90 | >0.03 |
| II | Mineral oil | 80-120 | ≥90 | ≤0.03 |
| III | Mineral oil | ≥120 | ≥90 | ≤0.03 |
| IV | Poly-α-olefin | | | |
| V | Lubricating oil base oil other than the above described | | | |

*[1] Measured in accordance with ASTM D445 (JIS K2283).
*[2] Measured in accordance with ASTM D3338.
*[3] Measured in accordance with ASTM D4294 (JIS K2541).
*[2] Mineral oil with less than 90 vol % of saturated hydrocarbon and more than 0.03% by weight of sulfur content is also included in Group I.

<(A) Mineral Oil>
(A) Mineral Oil Belongs to Groups I to III in the API Categories Described Above.

The quality of (A) mineral oil is as described above, and mineral oil of the respective qualities described above will be obtained by refining methods. Specific examples of the mineral oil can include lubricating oil base oil such that the lubricating oil fraction obtained by vacuum distillation of the atmospheric residual oil obtained by atmospheric distillation of crude oil, has been refined by carrying out one or more processes such as solvent deasphalting, solvent extraction, hydrocracking, solvent dewaxing, and hydrogenation refining or lubricating oil base oil such as wax isomerized mineral oil.

Gas-to-liquid (GTL) base oil obtained by the Fischer-Tropsch method is also suitable base oil that can be used as Group III mineral oil. Such GTL base oil may be treated as Group III+lubricating oil base oil and is described, for example, in Patent Literatures of EP0776959, EP0668342, WO97/21788, WO00/15736, WO00/14188, WO00/14187, WO00/14183, WO00/14179, WO00/08115, WO99/41332, EP1029029, WO01/18156 and WO01/57166.

<(B) Synthetic Oil>
(B) Synthetic Oil Belongs to Group IV or Group V in the API Categories Described Above.

The poly-α-olefin belonging to Group IV can be obtained by acid catalyzed oligomerization using boron trifluoride, a chromic acid catalyst, for example, as described in USP3, 382,291, USP3,763,244, USP5,171,908, USP3,780,128, USP4,032,591, JPH1-163136A, USP4,967,032, and USP4, 926,004. The poly-α-olefin can also be obtained by methods, for example, such as employing a catalyst system containing a metallocene compound as described in JPS63-037102A, JP2005-200447A, JP2005-200448A, JP2009-503147A, and JP2009-501836A, by using transition metal complexes such as zirconium, titanium, and hafnium. When the poly-α-olefin is used as the lubricating oil base oil, a lubricating oil composition extremely excellent in temperature/viscosity characteristics and low temperature viscosity characteristics, and even heat resistance, can be obtained.

The poly-α-olefin is also industrially available and a poly-α-olefin with 40° C. kinematic viscosity of 5 mm$^2$/s to 4,000 mm$^2$/s is commercially available. Among them, use of poly-α-olefin with 5 to 70 mm$^2$/s is preferred in terms of providing a lubricating oil composition excellent in temperature/viscosity characteristics. Examples thereof include NEXBASE 2000 series manufactured by NESTE Corporation, Spectrasyn manufactured by ExxonMobil Chemical Company, Durasyn manufactured by Ineos Oligmers, and Synfluid manufactured by Chevron Phillips Chemical Co LLC., for example.

Examples of synthetic oil belonging to Group V include, for example, alkyl benzenes, alkyl naphthalenes, isobutene oligomers or their hydrides, paraffins, a polyoxyalkylene glycol, a dialkyl diphenyl ether, and polyphenyl ether and ester.

The majority of alkylbenzenes and alkylnaphthalenes are typically a dialkylbenzene or a dialkylnaphthalene with a C6-C14 alkyl chain length, and such alkylbenzenes or alkylnaphthalenes are produced by the Friedel-Craft alkylation reaction of benzene or naphthalene with an olefin. An alkylated olefin used in production of alkylbenzenes or alkylnaphthalenes may be a linear or branched olefin or combinations thereof. These production methods are described, for example, in USP3, 909, 432.

A fatty acid ester is preferred in terms of compatibility with the (C) ethylene-α-olefin copolymer. The fatty acid ester is not particularly limited, but examples thereof include the following fatty acid esters composed solely of carbon, oxygen, and hydrogen, such as a monoester produced from a monobasic acid and an alcohol; a diester produced from a dibasic acid and an alcohol, or from a diol and a monobasic acid or an acid mixture; a polyol ester produced by reacting a diol, a triol (for example, trimethylolpropane), a tetraol (for example, pentaerythritol), or a hexanol (for example, dipentaerythritol), for example, with a monobasic acid or an acid mixture. Examples of these esters include ditridecyl glutarate, di-2-ethylhexyl adipate, diisodecyl adipate, ditridecyl adipate, di-2-ethylhexyl sebacate, tridecyl pelargonate, di-2-ethylhexyl adipate, di-2-ethylhexyl azelate, trimethylolpropane caprylate, trimethylolpropane pelargonate, trimethylolpropane triheptanoate, pentaerythritol-2-ethylhexanoate, pentaerythritol pelargonate, and pentaerythritol tetraheptanoate, for example.

From the viewpoint of compatibility with the (C) ethylene-α-olefin copolymer, an alcohol with two or more functional hydroxyl groups is preferred as the alcohol moiety constituting the ester, and a C8 or more fatty acid is preferred as the fatty acid moiety. However, a C20 or less fatty acid that is readily industrially available, is more preferred in terms of production cost. The fatty acid constituting the ester may be of one type, and use of a fatty acid ester produced by using a mixture of two or more types of acids allows an effect of the present invention to be sufficiently exhibited. More specific examples of the fatty acid ester include a trimethylolpropane lauric acid-stearic acid mixed triester and diisodecyl adipate, for example, which are preferred due to compatibility between a saturated hydrocarbon component such as the (C) ethylene-α-olefin copolymer and stabilizers such as an antioxidant, a corrosion inhibitor, an antiwear agent, a friction modifier, a pour point depressant, a rust inhibitor and an antifoaming agent, which have a polar group as described below.

When the (B) synthetic oil in particular the poly-α-olefin, is used as the lubricating oil base oil, the lubricating oil composition of the present invention preferably contains a fatty acid ester in an amount of 1 to 20% by mass as the total lubricating oil composition being 100% by mass. Containing 1% by mass or more of the fatty acid ester renders favorable compatibility with lubricating oil sealing materials such as resins and elastomers in various internal combustion engines and industrial machinery. Specifically, swelling of the lubricating oil sealing material can be controlled. From the viewpoint of oxidation stability or heat resistance, the amount of ester is preferably 20% by mass or less. When the mineral oil is contained in the lubricating oil composition, the fatty acid ester is not necessarily required because the mineral oil itself has an effect of inhibiting swelling of the lubricating oil sealing material.

The (B) synthetic oil is preferred compared to the (A) mineral oil in terms of superior heat resistance and temperature/viscosity characteristics. In the lubricating oil composition of the present invention, one type of (A) mineral oil or (B) synthetic oil may be used singly as the lubricating oil base oil, or an arbitrary mixture of two or more types of lubricating oil selected from among the (A) mineral oil and the (B) synthetic oil, for example, may be used.

The lubricating oil composition for hydraulic fluid according to the present invention contains lubricating oil base oil comprising the aforementioned (A) mineral oil and/or the (B) synthetic oil and the aforementioned viscosity modifier for lubricating oil, and has the following (D1) characteristics.

(D1) A Kinematic Viscosity at 40° C. being 28 to 170 mm²/s.

The kinematic viscosity at 40° C. (kinematic viscosity measured according to the method described in JIS K2283) is 28 to 170 mm²/s, preferably 30 to 110 mm²/s, more preferably 36 to 80 mm²/s, and further preferably 40 to 75 mm²/s. When the kinematic viscosity at 40° C. of the lubricating oil composition for hydraulic fluid exceeds 110 mm²/s, a stirring torque upon stirring the lubricating oil composition increases, resulting in poor energy saving in a hydraulic system using the lubricating oil composition, and when it is below 28 mm²/s, an oil film of the lubricating oil composition cannot be retained, resulting in insufficient lubricity being obtained.

Viscosities of products of industrial lubricating oil are generally specified by the 40° C. kinematic viscosity, and the viscosity range is regulated by JIS K2001 (based on ISO 3448). A tolerable level of 10% is established for each of the above and below centered on each viscosity. For example, lubricating oil with 40° C. kinematic viscosity of 68 mm²/s is denoted as ISO VG68, and a range of tolerable 40° C. kinematic viscosity is 61.2 to 74.8 mm²/s. A suitable range varies depending on the type of hydraulic system and conditions for use, and hydraulic oil from ISO VG32 to ISO VG150 is preferably used. Lubricating oil compositions of equivalent viscosity grades are usually compared with each other upon comparing their performance.

The lubricating oil composition for hydraulic fluid according to the present invention further has the characteristics of (D2) and (D3).

(D2) A Viscosity Index being 120 or More.

This viscosity index (the viscosity index measured according to the method described in JIS K2283) is preferably 120 or more, more preferably 130 or more, further preferably 140 or more, and particularly preferably 150 or more. Within this range of the viscosity index, the lubricating oil composition has excellent temperature/viscosity characteristics and can achieve both the aforementioned energy saving and lubricity over a wide range of temperatures.

(D3) A Pour Point being -20° C. or Lower.

The pour point (the pour point measured according to the method described in ASTM D97) of the lubricating oil composition for hydraulic fluid according to the present invention is preferably -20° C. or lower, more preferably -30° C. or lower, and further preferably -40° C. or lower. A low pour point indicates that the lubricating oil composition has excellent low temperature characteristics.

The lubricating oil composition for hydraulic fluid of the present invention preferably contains the aforementioned (C) ethylene-α-olefin copolymer at a proportion of 1 to 10% by mass, more preferably at a proportion of 2 to 10% by mass, further preferably at a proportion of 3 to 8% by mass, and particularly preferably at a proportion of 4 to 7% by mass.

The lubricating oil composition for hydraulic fluid of the present invention preferably contains lubricating oil base oil comprising the aforementioned (A) mineral oil and/or (B) synthetic oil at a proportion of 90 to 99% by mass and the aforementioned viscosity modifier for lubricating oil at a proportion of 1 to 10% by mass. However, the total of the lubricating oil base oil and the viscosity modifier for lubricating oil is taken as 100% by mass. The lubricating oil composition for hydraulic fluid of the present invention preferably contains the lubricating oil base oil at a proportion of 90 to 98% by mass and the viscosity modifier for lubricating oil at a proportion of 2 to 10% by mass, more preferably the lubricating oil base oil at a proportion of 92 to 97% by mass and the viscosity modifier for lubricating oil at a proportion 3 to 8% by mass, and further preferably the lubricating oil base oil at a proportion of 93 to 96% by mass and the viscosity modifier for lubricating oil at a proportion 4 to 7% by mass.

Examples of one preferred aspect include an aspect in which 30 to 100% by mass of the lubricating oil base oil is the (A) mineral oil. A high proportion of (A) mineral oil occupied in the lubricating oil base oil provides excellent solubility of the additives described below, as well as facilitation of availability and excellent economic efficiency. 50 to 100% by mass of mineral oil is more preferred, and 80 to 100% by mass of mineral oil is further preferred. Among the mineral oil, the Group III in the API categories is preferred because the Group III has excellent temperature/viscosity characteristics and can achieve both oil film retention at a high temperature and a low torque at a low temperature.

Examples of another preferred aspect include an aspect in which 30 to 100% by mass of the lubricating oil base oil is the (B) synthetic oil, and the (B) synthetic oil is a poly-α-olefin and/or ester oil. 50 to 100% by mass of synthetic oil is more preferred, and 80 to 100% by mass of synthetic oil is further preferred. A high proportion of the (B) synthetic oil occupied in the lubricating oil base oil renders excellent heat resistance, excellent temperature/viscosity characteristics, and excellent low temperature characteristics, which is referred.

The lubricating oil composition for hydraulic fluid of the present invention may also contain additives such as an extreme pressure agent, a detergent dispersant, a viscosity index improver, an antioxidant, a corrosion inhibitor, an antiwear agent, a friction modifier, a pour point depressant, a rust inhibitor, and an antifoam agent.

Examples of the additive used in the lubricating oil compositions of the present invention can include the following additives, and one type of these additives can be used singly or in combinations of two or more thereof. The extreme pressure agent is a general term for those having an anti-seizing effect when metals with each are exposed to a high load condition, and the agent is not particularly limited thereto, and examples thereof include sulfur-based extreme pressure agents such as sulfides, sulfoxides, sulfones, thiophosphinates, thiocarbonates, sulfide oil and fat, and a sulfide olefin; phosphates such as a phosphate, a phosphite, a phosphate amine salt, and phosphite amines; halogene-based compounds such as a chlorinated hydrocarbon. These compounds may also be used in combinations of two or more types thereof.

Before reaching extreme pressure lubrication conditions, a hydrocarbon or other organic components constituting the lubricating oil composition are carbonized before the extreme pressure lubrication conditions due to heating and shearing, whereby a carbide coating may be formed on a metal surface. Therefore, a single use of the extreme pressure agent inhibits contact between the extreme pressure agent and a metal surface by the carbide coating, whereby the extreme pressure agent may not be expected to be fully effective.

A single extreme pressure agent may be added, however, since the lubricating oil composition for hydraulic fluid in the present invention is mainly composed of a saturated hydrocarbon such as the copolymer, the extreme pressure agent is preferably added in advance in a state of being dissolved in lubricating oil base oil such as mineral oil or synthetic hydrocarbon oil, together with other additive to be used, from the viewpoint of dispersibility. Specifically, more preferred is a method for selecting a so-called additive package in which various components such as an extreme pressure agent component are preliminarily compounded and further dissolved in lubricant base oil such as mineral oil or synthetic hydrocarbon oil, followed by adding the package to a lubricating oil composition.

Examples of a preferred additive package include Anglamol-98A, Anglamol-6043, Anglamol 6085U, and LUBRIZOL 1047U, manufactured by Lubrizol Corporation, HITEC 1532 manufactured by Afton Chemical Corporation, HITEC 307 manufactured by Afton Chemical Corporation, HITEC 3339 manufactured by Afton Chemical Corporation, and Additin RC 9410 manufactured by LANXESS Corporation, for example.

The extreme pressure agent is used in a range of 0 to 10% by mass relative to 100% by mass of the lubricating oil composition, if necessary. Examples of the antiwear agent include an inorganic or organic molybdenum compound such as molybdenum disulfide, graphite, antimony sulfide, and polytetrafluoroethylene. The antiwear agent is used in a range of 0 to 3% by mass relative to 100% by mass of the lubricating oil composition, if necessary.

Examples of the friction modifier include amine compounds, imide compounds, fatty acid esters, fatty acid amides, and fatty acid metal salts, for example, which have at least one C6-C30 alkyl or alkenyl group in the molecule and particularly a linear C6-C30 alkyl or linear C6-C30 alkenyl group.

Examples of the amine compound can include a linear or branched, preferably linear C6-C30 aliphatic monoamine, a linear or branched, preferably linear aliphatic polyamine, or an alkylene oxide adduct of these aliphatic amines, for example. Examples of the imide compound include succinic imide having a linear or branched C6-C30 alkyl or alkenyl group and/or its modified compounds by carboxylic acid, boric acid, phosphoric acid, and sulfuric acid, for example. Examples of the fatty acid ester can include an ester of a linear or branched, preferably linear C7-C31 fatty acid and an aliphatic monovalent alcohol or an aliphatic polyhydric alcohol, for example. Examples of the fatty acid amide can include an amide of a linear or branched, preferably linear C7-C31 fatty acid and an aliphatic monoamine or an aliphatic polyamine, for example. Examples of the fatty acid metal salt include alkaline earth metal salts (a magnesium salt and a calcium salt, for example) and zinc salts, for example, of linear or branched, preferably linear C7-C31 fatty acids.

The friction modifier is used in a range of 0.01 to 5.0% by mass relative to 100% by mass of the lubricating oil composition, if necessary.

Examples of the detergent dispersant include a metal sulfonate, a metal phenate, a metal phosphanate, and succinimide, for example. The detergent dispersant is used in a range of 0 to 15% by mass relative to 100% by mass of the lubricating oil composition, if necessary.

As the viscosity index improver, in addition to an ethylene-α-olefin copolymer (excluding the (C) ethylene-α-olefin copolymer), known viscosity index improvers such as an olefin copolymer having a molecular weight exceeding 50,000 or higher, a methacrylate-based copolymer, a liquid polybutene, and a poly-α-olefin with 100° C. kinematic viscosity of 15 mm$^2$/s or higher, can be combined for use. The viscosity index improver is used in a range of 0 to 50% by mass relative to 100% by mass of the lubricating oil composition, if necessary.

Examples of the antioxidant include phenolic and amine-based compounds such as 2,6-di-t-butyl-4-methylphenol. The antioxidant is used in a range of 0 to 3% by mass relative to 100% by mass of the lubricating oil composition, if necessary.

Examples of the corrosion inhibitor include compounds such as benzotriazole, benzimidazole, and thiadiazole. The corrosion inhibitor is used in a range of 0 to 3% by mass relative to 100% by mass of the lubricating oil composition, if necessary.

Examples of the rust inhibitor include compounds such as various amine compounds, carboxylic acid metal salts, polyhydric alcohol esters, phosphorus compounds, and sulfonates. The rust inhibitor is used in a range of 0 to 3% by mass relative to 100% by mass of the lubricating oil composition, if necessary.

Examples of the antifoaming agent include silicone-based compounds such as dimethylsiloxane and a silica gel dispersion, and an alcohol-based compound or an esteric compound. The antifoaming agent is used in a range of 0 to 0.2% by mass relative to 100% by mass of the lubricating oil composition, if necessary.

Various known pour point depressants can be used as the pour point depressant. Specifically, a polymer compound containing an organic acid ester group is used, and a vinyl polymer containing an organic acid ester group is particularly suitably used. Examples of the vinyl polymer containing an organic acid ester group include a (co) polymer of alkyl methacrylate, a (co) polymer of alkyl acrylate, a (co) polymer of alkyl fumarate, a (co) polymer of alkyl maleate, and an alkylated naphthalene, for example.

Such a pour point depressant has a melting point of −13° C. or lower, preferably −15° C., and further preferably −17° C. or lower. The melting point of the pour point depressant is measured by using a differential scanning calorimeter (DSC). Specifically, the melting point is determined from the endothermic curve obtained when approximately 5 mg of a sample was filled in an aluminum pan, raised to a temperature of 200° C., held at 200° C. for 5 minutes, then cooled to −40° C. at 10° C./min, held at −40° C. for 5 minutes, and then heated at 10° C./min.

The aforementioned pour point depressant further has a weight-average molecular weight in terms of polystyrene, obtained by gel permeation chromatography, in a range of 20,000 to 400,000, preferably 30,000 to 300,000, and more preferably 40,000 to 200,000.

The pour point depressant is used in a range of 0 to 2% by mass relative to 100% by mass of the lubricating oil composition, if necessary.

In addition to the above additives, an antiemulsifier, a coloring agent, and an oily agent (oiliness agent), for example, can be used, if necessary.

<Use>

The lubricating oil composition of the present invention can be suitably used as hydraulic fluid for various industrial machines and transportation machinery, and has extremely excellent temperature/viscosity characteristics, namely, oil film retention at a high temperature and low temperature viscosity characteristics, compared to conventional lubricating oil containing the same lubricating oil base oil, whereby the lubricating oil composition can greatly contribute to energy saving in hydraulic systems. The lubricating oil composition also maintains lubrication performance in hydraulic systems over a long period of use due to its excellent shear stability, contributing to maintaining system performance. The lubricating oil composition of the present invention is extremely useful particularly as a hydraulic oil for machine tools, a hydraulic oil for forming machines, and a hydraulic oil for construction machinery.

EXAMPLES

The present invention will be more specifically described below based on Examples, but the present invention is not limited to these Examples.

[Evaluation Method]

In the following Examples and Comparative Examples, physical properties of ethylene-α-olefin copolymers and hydraulic fluid, for example, were measured by the following methods.

<Ethylene Content (Mol %)>

By using a Fourier transform infrared spectrophotometer FT/IR-610 or FT/IR-6100 manufactured by JASCO Corporation, an absorbance ratio of absorption in the vicinity of 1155 cm-1 based on propylene backbone vibration to absorbance in the vicinity of 721 cm-1 based on transverse vibration of a long chain methylene group (D1155 cm-1/D721 cm-1), was calculated, and an ethylene content (% by weight) was obtained from a calibration curve preliminarily prepared (prepared by using a standard sample in ASTM D3900). The ethylene content (% by weight) obtained was then used to determine the ethylene content (mol %) according to the following formula.

[Math. 3]

$$\text{Ethylene molar content rate (mol \%)} \frac{[\text{Ethylene weight content rate(wt \%)}/28]}{[\text{Ethylene weight content rate(wt \%)}/28] + [\text{Propylene weight content rate(wt \%)}/42]}$$

<150° C. Rotational Viscosity>

A 150° C. rotational viscosity was measured by using a B-type viscometer according to the method described in JIS Z8803.

<Hasen Chromaticity>

A Hazen chromaticity (an APHA value) was determined according to the method described in JIS K0071.

<B Value>

$^{13}$C-NMR spectra were measured by using o-dichlorobenzene/benzene-d$_6$ (4/1 [vol/vol %]) as a measurement solvent under the conditions of measurement temperature 120° C., spectral width 250 ppm, pulse repetition time 5.5 s, and pulse width 4.7·µs (45° pulse) (100 MHZ, JEOL ECX400P), or under the measurement conditions of measurement temperature 120° C., spectral width 250 ppm, pulse repetition time 5.5 s, and pulse width 5.0·µs (45° pulse) (125 MHZ, Bruker Biospin AVANCEIIIcryo-500), and the B value was calculated based on formula [1] below. The assignment of peaks was carried out with reference to the previously published literature.

[Math. 4]

$$B = \frac{P_{OE}}{2P_O \cdot P_E} \quad [1]$$

In formula [1], $P_E$ represents a molar fraction of ethylene component, $P_O$ represents a molar fraction of α-olefin component, and $P_{OE}$ represents a molar fraction of ethylene-α-olefin chain in a total dyad chain.

<Weight-Average Molecular Weight, Molecular Weight Distribution>

A molecular weight distribution was measured by using a HLC-8320 GPC manufactured by Tosoh Corporation as follows. A TSKgel SuperMultipore HZ-M (4 columns) was used as separation columns, a column temperature was 40° C., tetrahydrofuran (manufactured by Wako Pure Chemical Industries, Ltd.) was used as a mobile phase, an expansion rate was set at 0.35 ml/min, a sample concentration was 5.5 g/L, sample injection volume was 20 µl, and a differential refractometer was used as a detector. Standard polystyrenes manufactured by Tosoh Corporation (PStQuick MP-M) were used. According to general calibration procedures, a weight-average molecular weight (Mw) and a number-average molecular weight (Mn) were calculated in terms of polystyrene molecular weight and a molecular weight distribution (Mw/Mn) was calculated from these values.

<Melting Point>

By using a Seiko Instruments Inc. X-DSC-7000, approximately 8 mg of ethylene-α-olefin copolymer was placed in an aluminum sample pan that can be easily sealed and set in a DSC cell, and it was raised from room temperature to 150° C. at 10° C./min under a nitrogen atmosphere, then held at 150° C. for 5 minutes, and thereafter lowered at 10° C./min to −100° C. (temperature lowering process). The DSC cell was then held at −100° C. for 5 minutes, raised at 10° C./min, and a temperature at which the enthalpy curve obtained during a temperature raising process exhibits the maximum value was determined as a melting point (Tm), and the total endothermic value accompanying melting was defined as heat of fusion (ΔH). No peak observed or a value of heat of fusion (ΔH) that was 1 J/g or less, deemed to indicate no melting point (Tm). The melting point (Tm) and the heat of fusion (ΔH) were determined based on JIS K7121.

<Chlorine Content>

By using a Thermo Fisher Scientific Inc. ICS-1600, an ethylene-α-olefin copolymer was placed in a sample port, and underwent fire decomposition at a combustion furnace at a set temperature of 900° C. in an Ar/O$_2$ gas stream. The generated gas obtained was absorbed into an absorbent solution, and the chlorine content (amount of chlorine contained) was determined by ion chromatography.

<Weighing Accuracy>

A 2 L separable flask leaving to stand on an electronic balance was fed with 100 g of polymer heated to 80° C. by a gear pump. In this case, after stopping the pump, liquid having dripped from a discharge port was confirmed, and a case in which a weighing error of 5% or more relative to a regulated weight was observed, was considered that liquid dripping resulted.

<Solubility>

100 g of polymer was weighed in a 2 L separable flask, 900 g of the mineral oil described below was added thereto, the mixture was raised to a temperature of 80° C. and stirred with a stirring rod at 100 rpm, and a time for complete and homogeneous dissolution was measured visually every 30 minutes. In a case in which an undissolved material was observed even after 3 hours of stirring, this case was evaluated as not "dissolved."

<Kinematic Viscosity>

The 100° C. kinematic viscosity and 40° C. kinematic viscosity were measured by the method described in JIS K2283.

<Low Temperature Viscosity>

The low temperature viscosity at −40° C. was measured by the method described in ASTM D6821. When the viscosity exceeds 200,000 mPa·s, it was determined to be unmeasurable.

<Shear Stability>

For shear stability of the lubricating oil composition, a shear test was carried out on a lubricating oil composition in accordance with the method described in CRC L-45-T-93, by using a KRL shear tester under the shear conditions of test time of 20 hours, test temperature of 60° C., and bearing rotation speed of 1450 rpm, and a 40° C. kinematic viscosity was measured after the test.

[Production of Ethylene-α-Olefin Copolymer (B)]

An ethylene-α-olefin copolymer (B) was produced according to the following Polymerization Examples. Note, however, the obtained ethylene-α-olefin copolymer (B) underwent hydrogenation operation, if necessary, by the following method.

<Hydrogenation Operation>

A stainless steel autoclave with an internal volume of 1 L was added with 100 mL of a hexane solution of a 0.5% by mass Pd/alumina catalyst and 500 mL of a 30% by mass hexane solution of ethylene-α-olefin copolymer, and was sealed followed by nitrogen substitution. The mixture was then raised to a temperature of 140° C. under stirring, and then the inner system was substituted with hydrogen and was increased to a pressure of 1.5 MPa with hydrogen to carry out a hydrogenation reaction for 15 minutes.

<Synthesis of Metallocene Compound>

Synthesis Example 1

Synthesis of [methylphenylmethylene ($\eta^5$-cyclopentadienyl) ($\eta^5$-2,7-di-t-butylfluorenyl)] zirconium dichloride (i) Synthesis of 6-methyl-6-phenylfulvene Under a nitrogen atmosphere, a 200-mL three-neck flask was added with 7.3 g (101.6 mmol) of lithium cyclopentadiene and 100 mL of dehydrated tetrahydrofuran and the mixture was stirred. The solution was cooled in an ice bath and 15.0 g (111.8 mmol) of acetophenone was added dropwise. Thereafter, the solution was stirred at room temperature for 20 hours, and the resulting solution was quenched with a diluted hydrochloric acid aqueous solution. 100 mL of hexane was added thereto to extract a soluble material, and this organic layer was washed with water and saturated brine, then dried over anhydrous magnesium sulfate. The solvent was then removed, and the resulting viscous liquid was separated by column chromatography (hexane) to obtain a target product (red viscous liquid).

(ii) Synthesis of methyl (cyclopentadienyl) (2,7-di-t-butyl fluorenyl) (phenyl) methane Under a nitrogen atmosphere, a 100 mL three-neck flask was added with 2.01 g (7.20 mmol) of 2,7-di-t-butylfluorene and 50 mL of dehydrated t-butylmethyl ether. A n-butyl lithium/hexane solution (1.65 M) 4.60 mL (7.59 mmol) was added gradually while being cooled in an ice bath, and stirred at room temperature for 16 hours. After having added 1.66 g (9.85 mmol) of 6-methyl-6-phenylfulvene, the mixture was stirred under heat refluxing for 1 hour. 50 ML of water was gradually added while being cooled in an ice bath, and the resulting two-layer solution was transferred to a 200 mL separatory funnel. After 50 mL of diethyl ether was added and the mixture was shaken several times to remove an aqueous layer, and an organic layer was washed with 50 ml of water three times and with 50 mL of saturated brine once. The organic layer was dried over anhydrous magnesium sulfate for 30 minutes, and the solvent was distilled off under reduced pressure. When ultrasound waves were applied to the solution obtained by having added a small amount of hexane, a solid precipitated, which was collected and washed with a small amount of hexane. The precipitated substance was dried under reduced pressure to obtain 2.83 g of methyl (cyclopentadienyl) (2,7-di-t-butylfluorenyl) (phenyl) methane as a white solid.

(iii) Synthesis of [methylphenylmethylene ($\eta^5$-cyclopentadienyl) ($\eta^5$-2,7-di-t-butylfluorenyl)]zirconium dichloride Under a nitrogen atmosphere, a 100 mL Schlenk tube was sequentially added with 1.50 g (3.36 mmol) of methyl (cyclopentadienyl) (2,7-di-t-butylfluorenyl) (phenyl) methane, 50 mL of dehydrated toluene and 570 µL (7.03 mmol) of THF. A n-butyl lithium/hexane solution (1.65 M) 4.20 mL (6.93 mmol) was added gradually while being cooled in an ice bath, and stirred at 45° C. for 5 hours. The solvent was removed under reduced pressure and 40 mL of dehydrated diethyl ether was added to prepare a red solution. 728 mg (3.12 mmol) of zirconium tetrachloride was added while being cooled in a methanol/dry ice bath, and the mixture was stirred for 16 hours while being gradually raised to room temperature to obtain a red-orange slurry. The solid obtained by removing the solvent under reduced pressure was brought into a glove box, washed with hexane, and extracted with dichloromethane. The solvent was removed under reduced pressure and concentrated, a small amount of hexane was added, and the mixture was left at −20° C., resulting in precipitation of a red-orange solid. This solid was washed with a small amount of hexane and dried under reduced pressure to yield 1.20 g of [methylphenylmethylene ($\eta^5$-cyclopentadienyl) ($\eta^5$-2,7-di-t-butylfluorenyl)] zirconium dichloride as a red-orange solid.

Synthesis Example 2

Synthesis of [ethylene ($\eta^5$-cyclopentadienyl) ($\eta^5$-2,7-di-t-butylfluorenyl)] zirconium dichloride

[ethylene ($\eta^5$-cyclopentadienyl) ($\eta^5$-2,7-di-t-butylfluorenyl)] zirconium dichloride was synthesized by the method described in JP4367687B Polymerization Example 1

A stainless steel autoclave with a fully nitrogen-substituted internal volume of 2 L, was charged with 910 mL of heptane and 50 g of propylene, a temperature in the system was raised to 130° C., and total pressure was then set to 1 MPaG by applying 0.082 MPa of hydrogen and 0.082 MPa of ethylene. Then 0.4 mmol of triisobutylaluminum, 0.0006 mmol of [methylphenylmethylene ($\eta^5$-cyclopentadienyl) ($\eta^5$-2,7-di-t-butyl fluorenyl] zirconium dichloride and 0.006 mmol of N, N-dimethylanilinium tetrakis(pentafluorophenyl) borate were then injected under pressure with nitrogen, and polymerization was started by setting a stirring rotation speed to 400 rpm. Thereafter, the polymerization was carried out at 130° C. for 5 minutes, keeping the total pressure at 1 MPaG by continuously feeding only ethylene. The polymerization was completed by having added a small amount of ethanol to the system, and then the unreacted ethylene, propylene, and hydrogen were purged. The resulting polymer solution was washed with 1000 mL of 0.2 mol/l hydrochloric acid three times, then with 1000 mL of distilled water three times, dried over magnesium sulfate, and the solvent was removed under reduced pressure. After the resulting polymer was dried overnight under reduced pressure at 80° C., thin-film distillation was further carried out by using thin-film distillation apparatus Model 2-03, manufactured by Shinko Pantech Co., Ltd. at a set temperature of 180° C. and a flow rate of 3.1 ml/min while the degree of reduced pressure was maintained at 400 Pa, to then obtain 26 g of an ethylene-propylene copolymer.

Polymerization Example 2

A stainless steel autoclave with a fully nitrogen-substitute internal volume of 2 L, was charged with 910 mL of heptane and 50 g of propylene, a temperature in the system was raised to 130° C., and total pressure was then set to 1 MPaG by applying 0.047 MPa of hydrogen and 0.085 MPa of ethylene. Then 0.4 mmol of triisobutylaluminum, 0.0006 mmol of [methylphenylmethylene ($\eta^5$-cyclopentadienyl) ($\eta^5$-2,7-di-t-butyl fluorenyl] zirconium dichloride and 0.006 mmol of N, N-dimethylanilinium tetrakis(pentafluorophenyl) borate were then injected under pressure with nitrogen, and polymerization was started by setting a stirring rotation speed to 400 rpm. Thereafter, the polymerization was carried out at 130° C. for 5 minutes, keeping the total pressure at 1 MPaG by continuously feeding only ethylene. The polymerization was completed by having added a small amount of ethanol to the system, and then the unreacted ethylene, propylene, and hydrogen were purged. The resulting polymer solution was washed with 1000 mL of 0.2 mol/l hydrochloric acid three times and then with 1000 mL of distilled water three times, dried over magnesium sulfate, and the solvent was removed under reduced pressure. After the resulting polymer was dried overnight under reduced pressure at 80° C., thin-film distillation was further carried out by using thin-film distillation apparatus Model 2-03, manufactured by Shinko Pantech Co., Ltd. at a set temperature of 180° C. and a flow rate of 3.1 ml/min while the degree of reduced pressure was maintained at 400 Pa, to then obtain 26 g of an ethylene-propylene copolymer.

Polymerization Example 3

A stainless steel autoclave with a fully nitrogen-substituted internal volume of 1 L, was charged with 250 mL of heptane, a temperature in the system was raised to 50° C., and then ethylene, propylene, and hydrogen at a flow rate of 25 L/hr, 75 L/hr, and 100 L/hr, respectively, were continuously fed into a polymerizer, and the mixture was stirred at a stirring speed of 600 rpm. Then 0.2 mmol of triisobutyl-aluminum was fed into the polymerizer, and then a mixture of 0.688 mmol of MMAO and 0.00230 mmol of [ethylene ($\eta^5$-cyclopentadienyl) ($\eta^5$-2,7-di-t-butyl fluorenyl] zirconium dichloride, which were preliminarily mixed in toluene for 15 minutes or longer, was fed into the polymerizer to then start polymerization. Thereafter, the polymerization was carried out at 50° C. for 15 minutes by continuing continuous feeding of ethylene, propylene, and hydrogen. After stopping the polymerization by adding a small amount of isobutyl alcohol into the system, unreacted monomer was purged. The obtained polymer solution was washed with 100 mL of 0.2 mol/l hydrochloric acid three times and then with 100 mL of distilled water three times, dried over magnesium sulfate, and then the solvent was distilled off under reduced pressure. The resulting polymer was dried overnight under reduced pressure at 80° C., to obtain 1.43 g of an ethylene-propylene copolymer. Furthermore, the ethylene-propylene copolymer was subjected to the hydrogenation operation described above.

Polymerization Example 4

Into a glass polymerizer with a fully nitrogen-substituted internal volume of 1 L, 250 mL of decane was charged, the temperature in the system was raised to 130° C., and then ethylene, propylene and hydrogen were continuously fed into the polymerizer at a flow rate of 25 L/hr, 75 L/hr, and 100 L/hr, respectively, and stirred at a stirring rotation speed of 600 rpm. Then 0.2 mmol of triisobutylaluminum was fed into the polymerizer, and then a mixture of 1.213 mmol of MMAO and 0.00402 mmol of [methylphenylmethylene ($\eta^5$-cyclopentadienyl) ($\eta^5$-2,7-di-t-butyl fluorenyl] zirconium dichloride, which were preliminarily mixed in toluene for 15 minutes or longer, was fed into the polymerizer, to then start polymerization. Thereafter, continuous supply of ethylene, propylene, and hydrogen was continued, and polymerization was performed at 130° C. for 15 minutes. After stopping the polymerization by adding a small amount of isobutyl alcohol into the system, unreacted monomer was purged. The obtained polymer solution was washed with 100 mL of 0.2 mol/l hydrochloric acid three times and then with 100 mL of distilled water three times, dried over magnesium sulfate, and then the solvent was distilled off under reduced pressure. The resulting polymer was dried overnight under reduced pressure at 80° C., to obtain 0.77 g of an ethylene-propylene copolymer. Furthermore, the ethylene-propylene copolymer was subjected to the hydrogenation operation described above.

Polymerization Example 5

A continuous polymerizer with a fully nitrogen-substituted internal volume of 2 L and with a stirring blade, was filled with one liter of dehydrated and purified hexane, a hexane solution of ethylaluminum sesquichloride (Al ($C_2H_5$)$_{1.5}$·Cl$_{1.5}$), adjusted to 96 mmol/L, was continuously fed at volume of 500 ml/h for 1 hour, followed by a further continuous feed of a hexane solution of VO(OC$_2H_5$) Cl$_2$ as a catalyst, adjusted to 16 mmol/l, at volume of 500 ml/h and a continuous feed of hexane at volume of 500 ml/h. Meanwhile, polymerization liquid was continuously removed from the top of the polymerizer so that the polymerization liquid in the polymerizer was always 1 liter. Next, an ethylene gas, a propylene gas, and hydrogen gas, were supplied at volume of 38 L/h, 38 L/h, and 3 L/h, respectively, by using a bubbling tube. The copolymerization reaction was carried out at 35° C. by circulating a refrigerant in a jacket attached to the outside of the polymerizer.

The polymerization solution containing the ethylene-propylene copolymer obtained under the above conditions was washed with 100 mL of 0.2 mol/l hydrochloric acid three times and then with 100 mL of distilled water three times, dried over magnesium sulfate, and then the solvent was removed under reduced pressure. The resulting polymer was dried overnight under reduced pressure at 130° C. The ethylene content of the ethylene-propylene copolymer obtained was 53.0 mol %, the 150° C. rotational viscosity was 3,100 mPa·s, the Mw was 24,000, the Mw/Mn was 2.1, the B value was 1.2, the chlorine content was 18 ppm, and no melting point (no fusion peak) was observed.

Polymerization Example 6

A continuous polymerizer with a fully nitrogen-substituted internal volume of 2 L and with a stirring blade, was filled with one liter of dehydrated and purified hexane, a hexane solution of ethylaluminum sesquichloride $(Al(C_2H_5)_{1.5} \cdot Cl_{1.5})$, adjusted to 96 mmol/L, was continuously fed at volume of 500 ml/h for 1 hour, followed by a further continuous feed of a hexane solution of $VO(OC_2H_5)Cl_2$ as a catalyst, adjusted to 16 mmol/l, at volume of 500 ml/h and a continuous feed of hexane at volume of 500 ml/h. Meanwhile, polymerization liquid was continuously removed from the top of the polymerizer so that the polymerization liquid in the polymerizer was always 1 liter. Next, an ethylene gas, a propylene gas, and hydrogen gas, were supplied at volume of 47 L/h, 47 L/h, and 20 L/h, respectively, by using a bubbling tube. The copolymerization reaction was carried out at 35° C. by circulating a refrigerant in a jacket attached to the outside of the polymerizer.

The polymerization solution containing the ethylene-propylene copolymer obtained under the above conditions was washed with 100 mL of 0.2 mol/l hydrochloric acid three times, and then with 100 mL of distilled water three times, dried over magnesium sulfate, and then the solvent was removed under reduced pressure. The resulting polymer was dried overnight under reduced pressure at 130° C. The ethylene content of the ethylene-propylene copolymer obtained was 54.9 mol %, the 150° C. rotational viscosity was 260 mPa·s, the Mw was 14,000, the Mw/Mn was 2.0, the B value was 1.2, the chlorine content was 20 ppm, and no melting point (no fusion peak) was observed.

The polymers obtained in Polymerization Examples 1 to 4 (hydrogenated polymers for Polymerization Examples 3 and 4) were designated as Polymer 1 to Polymer 4, respectively. The physical properties of polymers 1 to 4 and the polymethacrylate (PMA), the polybutene (PIB), and the olefin copolymer (OCP), as well as the results of their solubility evaluation in mineral oil are shown in Table 2. Weighing accuracy for compounding was also evaluated for the liquid polymers, excluding the solid OCPs, and is also shown in Table 2. The PMA, PIB, OCP, and mineral oil used are as follows:

Polymethacrylate (PMA); a polymethacrylate (Viscoplex 0-220, manufactured by Evonik Industries AG) with a weight-average molecular weight of 41,800, as determined by GPC in the same manner as the ethylene-α-olefin copolymer.

Polybutene (PIB); a high molecular weight liquid polybutene with a weight-average molecular weight of 8,400 and a molecular weight distribution of 2.6 (Polybutene HV-1900 manufactured by JX Nippon Oil & Energy Corporation), as determined by GPC in the same manner as the ethylene-α-olefin copolymer Olefin copolymer (OCP); a solid olefin copolymer with a weight-average molecular weight of 155,000 and a molecular weight distribution of 2.1 (PARATONE 8900 manufactured by ExxonMobil Chemical Company), as measured by GPC in the same manner as in the ethylene-α-olefin copolymer.

(A) Mineral oil; mineral oil 1 (API (American Petroleum Institute) Group III mineral oil with 40° C. kinematic viscosity: 19.3 $mm^2/s$, viscosity index: 126 and pour point: −15° C.) (Yubase-4 manufactured by SK Lubricants Co., Ltd.)

TABLE 2

|  |  | Polymer 1 | Polymer 2 | Polymer 3 | Polymer 4 |
|---|---|---|---|---|---|
| Polymerization Example |  | Polymerization Example 1 | Polymerization Example 2 | Polymerization Example 3 | Polymerization Example 4 |
| Ethylene molar content rate | mol % | 56.3 | 53.0 | 53.4 | 48.7 |
| 150° C. rotational viscosity | mPa · s | 1,580 | 3,000 | 270 | 10 |
| Mw |  | 20,000 | 24,500 | 12,500 | 4,000 |
| Mw/Mn |  | 2.0 | 2.1 | 2.0 | 1.7 |
| Hasen chromaticity |  | 5 | 5 | 5 | 10 |
| B value |  | 1.2 | 1.2 | 1.2 | 1.2 |
| Melting point | ° C. | absent | absent | absent | absent |
| Chlorine content | ppm | <0.1 | <0.1 | <0.1 | <0.1 |
| Liquid dripping upon weighing |  | absent | absent | absent | present |
| 80° C. dissolution time | Hr | 1.0 | 1.0 | 0.5 | 0.5 |

|  |  | PMA | PIB | OCP |
|---|---|---|---|---|
| Polymerization Example |  | — | — | — |
| Ethylene molar content rate | mol % | — | — | 55.7 |
| 150° C. rotational viscosity | mPa · s | 150 | 180 | >20,000 |
| Mw |  | 42,000 |  | 155,000 |
| Mw/Mn |  | 1.9 | 2.6 | 2.1 |

TABLE 2-continued

| Hasen chromaticity | | 50 | 20 | — |
|---|---|---|---|---|
| B value | | — | — | — |
| Melting point | ° C. | | absent | 29 |
| Chlorine content | ppm | — | — | — |
| Liquid dripping upon weighing | | present | present | — |
| 80° C. dissolution time | Hr | 1.0 | 1.0 | not dissolved |

In compounding a lubricating oil composition, the previously described weighing accuracy and solubility in (A) mineral oil, were evaluated. The polymer 1 to polymer 3 dissolved without any problem at 80° C. in 30 minutes to 1 hour without any liquid dripping from the gear pump upon weighing. Polymers of the polymer 4, PMA, and PIB, on the other hand, dripped from the tip of the discharge port even upon stopping weighing by the gear pump, and an error with respect to prescribed filling volume resulted. The OCP did not dissolve at 80° C. even after 3 hours.

[Preparation of Lubricating Oil Composition for Hydraulic Fluid]

In preparing a lubricating oil composition for hydraulic fluid, the following were used in addition to the aforementioned (C) ethylene-α-olefin copolymer, PMA, PIB, and (A) mineral oil.

Pour point depressant; Irgaflow 720P manufactured by BASF Corporation.

(B) Synthetic oil; synthetic oil 1 (API (American Petroleum Institute) Group IV poly-α-olefin (40° C. kinematic viscosity: 17.7 mm²/s, viscosity index: 123, pour point: −60° C. or lower) (Synfluid PAO-4 manufactured by Chevron Phillips Chemical LLC).

<Lubricating Oil Composition for Hydraulic Fluid>

Example 1

A lubricating oil composition was prepared by compounding the lubricating oil composition for hydraulic fluid, the viscosity of which was adjusted to that equivalent to ISO 46 so that the total amount of mineral oil 1 and the polymer 1 as the (C) ethylene-α-olefin copolymer, together with a pour point depressant, was 100% by mass. The amounts of each component added and the physical properties of the lubricating oil composition are shown in Table 3.

Example 2

A lubricating oil composition was prepared by compounding the lubricating oil composition in the same manner as in Example 1, except that the Polymer 1 was replaced with the Polymer 2 in the amount added described in Table 3 and the amount of mineral oil 1 added was adjusted. The physical properties of the lubricating oil composition are shown in Table 3.

Reference Example 1

A lubricating oil composition was prepared by compounding the lubricating oil composition in the same manner as in Example 1, except that the Polymer 1 was replaced with the Polymer 3 described in Table 2 in the amount added described in Table 3 and the amount of mineral oil 1 added was adjusted. The physical properties of the lubricating oil composition are shown in Table 3.

Comparative Example 1

A lubricating oil composition was prepared by compounding the lubricating oil composition in the same manner as in Example 1, except that the Polymer 1 was replaced with a polymethacrylate (PMA) in the amount added described in Table 3 and the amount of mineral oil 1 added was adjusted. The physical properties of the lubricating oil composition are shown in Table 3.

Comparative Example 2

A lubricating oil composition was prepared by compounding the lubricating oil composition in the same manner as in Example 1, except that the Polymer 1 was replaced with the Polymer 4 described in Table 2 in the amount added described in Table 3 and the amount of mineral oil 1 added was adjusted. The physical properties of the lubricating oil composition are shown in Table 3.

Comparative Example 3

A lubricating oil composition was prepared by compounding the lubricating oil composition in the same manner as in Example 1, except that the Polymer 1 was replaced with a polybutene (PIB) in the amount added described in Table 3 and the amount of mineral oil 1 added was adjusted. The physical properties of the lubricating oil composition are shown in Table 3.

Example 3

A lubricating oil composition was prepared by compounding the lubricating oil composition in the same manner as in Example 2, except that the mineral oil 1 was replaced with synthetic oil 1 in the amount added described in Table 3 and the amount of polymer 2 added was adjusted. The physical properties of the lubricating oil composition are shown in Table 3.

TABLE 3

| | | Example 1 | Example 2 | Reference Example 1 | Comparative Example 1 |
|---|---|---|---|---|---|
| Polymer 1 | % by mass | 5.2 | | | |
| Polymer 2 | % by mass | | 4.7 | | |

TABLE 3-continued

| | | | | | |
|---|---|---|---|---|---|
| Polymer 3 | % by mass | | | 7.3 | |
| Polymer 4 | % by mass | | | | |
| PMA | % by mass | | | | 15.5 |
| PIB | % by mass | | | | |
| Pour point depressant | % by mass | 0.3 | 0.3 | 0.3 | |
| Mineral oil 1 | % by mass | 94. | 95.0 | 92.4 | 84.5 |
| Synthetic oil 1 | % by mass | | | | |
| 100° C. kinematic viscosity | mm²/s | 8.73 | 8.83 | 8.71 | 9.77 |
| 40° C. kinematic viscosity | mm²/s | 45.9 | 46.2 | 46.0 | 45.4 |
| Low temperature viscosity | mPa·s | 25,000 | 40,000 | 52,000 | 17,000 |
| 40° C. kinematic viscosity after shear test | mm²/s | 41.1 | 40.3 | 43.4 | 37.7 |

| | | Comparative Example 2 | Comparative Example 3 | Example 3 |
|---|---|---|---|---|
| Polymer 1 | % by mass | | | |
| Polymer 2 | % by mass | | | 4.5 |
| Polymer 3 | % by mass | | | |
| Polymer 4 | % by mass | 17.1 | | |
| PMA | % by mass | | | |
| PIB | % by mass | | 9.1 | |
| Pour point depressant | % by mass | 0.3 | 0.3 | |
| Mineral oil 1 | % by mass | 82.6 | 90.6 | |
| Synthetic oil 1 | % by mass | | | 95.5 |
| 100° C. kinematic viscosity | mm²/s | 8.28 | 7.68 | 8.78 |
| 40° C. kinematic viscosity | mm²/s | 46.1 | 45.9 | 46.0 |
| Low temperature viscosity | mPa·s | 85,000 | Non-measurable | 8,400 |
| 40° C. kinematic viscosity after shear test | mm²/s | 45.9 | 43.7 | 40.6 |

In comparison of Examples 1 and 2 each containing the (C) ethylene-α-olefin copolymer, as a lubricating oil composition for hydraulic fluid using the (A) mineral oil for lubricating oil base oil, with Comparative Example 1 containing PMA instead of the (C) ethylene-α-olefin copolymer, Examples 1 and 2 each maintain the higher 40° C. kinematic viscosity after the shear test of 40 mm²/s or higher than Comparative Example 1, and therefore the lubricating oil composition for hydraulic fluid of the present application can maintain its performance as hydraulic fluid for a longer period of time and continue to protect the operating mechanism. Moreover, Comparative Example 2, which uses the polymer 4, has low weighing accuracy, thereby making it very difficult to industrially obtain a lubricating oil composition. In Comparative Example 3 containing PIB instead of the (C) ethylene-α-olefin copolymer, on the other hand, when compounded so as to be ISO 46, the 100° C. kinematic viscosity is below 8 mm²/s, and when the operating mechanism was continuously applied and the oil temperature rose, the oil film strength of the metal sliding surface in the operating mechanism using the lubricating oil composition for hydraulic fluid, is low, which causes the oil film to be lost, allowing the metals to contact with each other, whereby wearing of the sliding surface may result. Moreover, the pourability also decreases significantly at a low temperature, making the use in a low temperature environment impossible.

The invention claimed is:

1. A viscosity modifier for lubricating oil, comprising an (C) ethylene-α-olefin copolymer having the following characteristics (C1) to (C5), and (C6):

(C1) an ethylene molar content rate is within a range of 53 to 58 mol %, (C2) a rotational viscosity at 150° C. is 300 to 8,000 mPa·s, (C3) a Hasen chromaticity is 30 or lower, (C4) a molecular weight distribution (Mw/Mn) is 2.0 or more and 2.2 or less in molecular weight obtained in terms of polystyrene, as measured by gel permeation chromatography (GPC), (C5) a B value represented by the following formula [1] is 1.1 or more:

$$B = \frac{P_{OE}}{2 P_O \cdot P_E} \quad [1]$$

wherein in the formula [1], $P_E$ represents a molar fraction of ethylene component, $P_O$ represents a molar fraction of α-olefin component, and $P_{OE}$ represents a molar fraction of ethylene-α-olefin chain in a total dyad chain and (C6) a weight-average molecular weight (Mw) is 20,000 to 30,000 obtained in terms of polystyrene, as measured by gel permeation chromatography (GPC).

2. A lubricating oil composition for hydraulic fluid, comprising: a lubricating oil base oil comprising a (A) mineral oil having the following characteristics (A1) to (A3) and/or a (B) synthetic oil having the following characteristics (B1) to (B3); and the viscosity modifier for lubricating oil according to claim 1, wherein the lubricating oil composition for hydraulic fluid has a kinematic viscosity at 40° C. of 28 to 170 mm²/s:

(A1) a kinematic viscosity at 40° C. is 10 to 100 mm²/s, (A2) a viscosity index is 90 or more, (A3) a pour point is 0° C. or lower, (B1) a kinematic viscosity at 40° C. is 4 to 100 mm²/s, (B2) a viscosity index is 90 or more, (B3) a pour point is −30° C. or lower.

3. The lubricating oil composition for hydraulic fluid according to claim 2, wherein an ethylene molar content rate of the (C) ethylene-α-olefin copolymer is within a range of 40 to 60 mol %.

4. The lubricating oil composition for hydraulic fluid according to claim 2, wherein a rotational viscosity of the (C) ethylene-α-olefin copolymer at 150° C. is 1,000 to 5,000 mPa·s.

5. The lubricating oil composition for hydraulic fluid according to claim 2, wherein an α-olefin of the (C) ethylene-α-olefin copolymer is propylene.

6. The lubricating oil composition for hydraulic fluid according to claim 2, wherein the content of the (C) ethylene-α-olefin copolymer is 1 to 10% by mass.

7. A hydraulic oil for machine tools, forming machines, or construction machinery, comprising the lubricating oil composition for hydraulic fluid according to claim 2.

8. A method for producing the viscosity modifier for lubricating oil according to claim 1, comprising a step of producing the (C) ethylene-α-olefin copolymer by the following method (α):

method (α): a method comprising a step of solution polymerizing ethylene and a C3-C20 α-olefin in the presence of a catalyst system comprising a bridged metallocene compound (a-1') represented by formula [II-I], and at least one compound (b) selected from the group consisting of an organometallic compound (b-1), an organoaluminum oxy compound (b-2), and a compound (b-3) that reacts with the bridged metallocene compound (a-1') to form an ion pair:

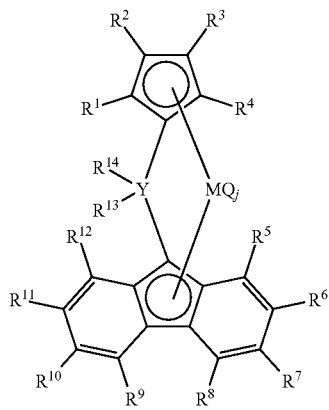

[II-I]

wherein in formula [II-I], $R^1$, $R^2$, $R^3$, $R^4$, $R^5$, $R^8$, $R^9$, and $R^{12}$ are each independently a hydrogen atom, a C1-C20 hydrocarbon group or a silicon-containing hydrocarbon group, and a plurality of adjacent groups are optionally connected together to form a ring structure, $R^6$ and $R^{11}$ are identical to each other and are each a hydrogen atom, a C1-C20 hydrocarbon group or a silicon-containing hydrocarbon group, $R^7$ and $R^{10}$ are identical to each other and are each a hydrogen atom, a C1-C20 hydrocarbon group or a silicon-containing hydrocarbon group, $R^6$, $R^7$, $R^{10}$ and $R^{11}$ are not simultaneously hydrogen atoms;

$R^6$ and $R^7$ are optionally bonded with a C2-C3 hydrocarbon to form a ring structure, $R^{10}$ and $R^{11}$ are optionally bonded with a C2-C3 hydrocarbon to form a ring structure, $R^{13}$ and $R^{14}$ are each independently an aryl group;

Y is a carbon atom or a silicon atom;

M is a titanium atom, a zirconium atom, or a hafnium atom;

Q is independently a halogen atom, a C1-C20 hydrocarbon group, an anionic ligand or a neutral ligand capable of coordinating with a lone electron pair; and j is an integer of 1 to 4.

* * * * *